(12) United States Patent
Martell et al.

(10) Patent No.: US 9,519,892 B2
(45) Date of Patent: Dec. 13, 2016

(54) SYSTEMS AND METHODS TO ACCELERATE TRANSACTIONS

(75) Inventors: Javier Martell, San Anselmo, CA (US); Mark Britto, Orinda, CA (US)

(73) Assignee: Boku, Inc., San Francisco, CA (US)

( * ) Notice: Subject to any disclaimer, the term of this patent is extended or adjusted under 35 U.S.C. 154(b) by 170 days.

(21) Appl. No.: 12/813,338

(22) Filed: Jun. 10, 2010

(65) Prior Publication Data
US 2011/0035302 A1    Feb. 10, 2011

Related U.S. Application Data

(60) Provisional application No. 61/231,302, filed on Aug. 4, 2009.

(51) Int. Cl.
| | | |
|---|---|---|
| G07F 19/00 | (2006.01) |
| H04M 15/00 | (2006.01) |
| G06Q 20/02 | (2012.01) |
| G06Q 20/10 | (2012.01) |
| G06Q 20/16 | (2012.01) |
| G06Q 20/32 | (2012.01) |

(Continued)

(52) U.S. Cl.
CPC .......... *G06Q 20/023* (2013.01); *G06Q 20/102* (2013.01); *G06Q 20/16* (2013.01); *G06Q 20/32* (2013.01); *G06Q 20/3223* (2013.01); *G06Q 30/04* (2013.01); *G06Q 40/025* (2013.01); *G06Q 40/12* (2013.12); *H04W 4/12* (2013.01)

(58) Field of Classification Search
None
See application file for complete search history.

(56) References Cited

U.S. PATENT DOCUMENTS

| | | |
|---|---|---|
| 5,283,829 A | 2/1994 | Anderson |
| 5,466,919 A | 11/1995 | Hovakimian |

(Continued)

FOREIGN PATENT DOCUMENTS

| | | |
|---|---|---|
| CN | 1591502 A | 3/2005 |
| EP | 1379098 A1 | 6/2003 |

(Continued)

OTHER PUBLICATIONS

Amazon.com, Inc., "Get Gold Box Deals Every Day with Amazon Text Alerts," located at http://www.amazon.com/gp/anywhere/sms/goldbox, available at least by Jun. 10, 2009.

(Continued)

*Primary Examiner* — Fateh M Obaid
(74) *Attorney, Agent, or Firm* — Stephen M. De Klerk

(57) ABSTRACT

Systems and methods to accelerate transactions made via mobile communications. In one aspect, a system includes: a memory to store transaction records indicating actual amounts of funds collected via a first plurality of premium messages transmitted to a first plurality of phone numbers; and a processor coupled with the memory to transmit, to a second plurality of phone numbers, a second plurality of premium messages to collect payments on behalf of a merchant. Before funds collected via the second premium messages become available, the processor identifies a portion of a total amount of funds charged via the second premium messages, based at least in part on the transaction records stored in the memory, and offers to provide the portion to the merchant.

16 Claims, 16 Drawing Sheets

(51) Int. Cl.
*G06Q 30/04* (2012.01)
*G06Q 40/02* (2012.01)
*G06Q 40/00* (2012.01)
*H04W 4/12* (2009.01)

(56) References Cited

U.S. PATENT DOCUMENTS

| | | | |
|---|---|---|---|
| 5,663,547 A | 9/1997 | Ziarno | |
| 5,708,422 A | 1/1998 | Blonder et al. | |
| 5,825,883 A * | 10/1998 | Archibald et al. | 705/53 |
| 5,826,241 A | 10/1998 | Stein et al. | |
| 5,845,260 A | 12/1998 | Nakano et al. | |
| 5,905,873 A | 5/1999 | Hartmann et al. | |
| 5,914,472 A | 6/1999 | Foladare et al. | |
| 5,945,653 A | 8/1999 | Walker et al. | |
| 5,953,710 A | 9/1999 | Fleming | |
| 6,227,447 B1 | 5/2001 | Campisano | |
| 6,282,276 B1 | 8/2001 | Felger | |
| 6,302,326 B1 | 10/2001 | Symonds et al. | |
| 6,473,808 B1 | 10/2002 | Yeivin et al. | |
| 6,612,488 B2 | 9/2003 | Suzuki | |
| 6,704,409 B1 | 3/2004 | Dilip et al. | |
| 6,718,178 B1 | 4/2004 | Sladek et al. | |
| 6,732,919 B2 | 5/2004 | Macklin et al. | |
| 6,736,322 B2 | 5/2004 | Gobburu et al. | |
| 6,788,771 B2 | 9/2004 | Manto | |
| 6,807,410 B1 | 10/2004 | Pailles et al. | |
| 6,928,558 B1 | 8/2005 | Allahwerdi et al. | |
| 6,965,872 B1 * | 11/2005 | Grdina | 705/413 |
| 6,996,409 B2 | 2/2006 | Gopinath et al. | |
| 6,999,943 B1 | 2/2006 | Johnson et al. | |
| 7,013,125 B2 | 3/2006 | Henrikson | |
| 7,080,049 B2 | 7/2006 | Truitt et al. | |
| 7,089,208 B1 | 8/2006 | Levchin et al. | |
| 7,107,068 B2 | 9/2006 | Benzon et al. | |
| 7,174,301 B2 * | 2/2007 | Florance et al. | 705/313 |
| 7,221,951 B2 | 5/2007 | Anvekar et al. | |
| 7,292,996 B2 | 11/2007 | Nobrega et al. | |
| 7,308,254 B1 | 12/2007 | Rissanen | |
| 7,315,541 B1 | 1/2008 | Housel et al. | |
| 7,331,518 B2 | 2/2008 | Rable | |
| 7,357,310 B2 | 4/2008 | Calabrese et al. | |
| 7,366,702 B2 | 4/2008 | David | |
| 7,374,079 B2 | 5/2008 | Nam et al. | |
| 7,386,477 B2 | 6/2008 | Fano | |
| 7,413,119 B2 | 8/2008 | Kubo et al. | |
| 7,434,723 B1 | 10/2008 | White et al. | |
| 7,437,331 B1 | 10/2008 | Rosenberger | |
| 7,458,507 B2 | 12/2008 | Fillinger et al. | |
| 7,478,055 B2 | 1/2009 | Goino | |
| 7,487,114 B2 * | 2/2009 | Florance et al. | 705/27.2 |
| 7,527,192 B1 | 5/2009 | Chaskin et al. | |
| 7,546,266 B2 | 6/2009 | Beirne et al. | |
| 7,558,777 B1 | 7/2009 | Santos | |
| 7,660,772 B2 | 2/2010 | Verkama | |
| 7,734,543 B2 | 6/2010 | Braco | |
| 7,748,614 B2 | 7/2010 | Brown | |
| 7,752,135 B2 | 7/2010 | Brown et al. | |
| 7,792,518 B2 | 9/2010 | Trioano et al. | |
| 7,848,500 B2 | 12/2010 | Lynam et al. | |
| 7,848,980 B2 | 12/2010 | Carlson | |
| 7,870,044 B2 | 1/2011 | Robertson | |
| 7,870,077 B2 | 1/2011 | Woo et al. | |
| 7,890,433 B2 | 2/2011 | Singhal | |
| 8,024,781 B2 | 9/2011 | Saunders et al. | |
| 8,073,774 B2 | 12/2011 | Pousti | |
| 8,116,730 B2 | 2/2012 | Smith | |
| 8,245,044 B2 | 8/2012 | Kang | |
| 8,249,964 B2 | 8/2012 | DePena | |
| 8,280,825 B2 | 10/2012 | Friedman | |
| 8,280,906 B1 | 10/2012 | Lillibridge et al. | |
| 8,554,670 B1 | 10/2013 | Blank et al. | |
| 8,660,941 B2 * | 2/2014 | Willey et al. | 705/38 |
| 2001/0003093 A1 | 6/2001 | Lundin | |
| 2001/0037264 A1 * | 11/2001 | Husemann et al. | 705/26 |
| 2001/0051920 A1 | 12/2001 | Joao et al. | |
| 2002/0004751 A1 | 1/2002 | Seki et al. | |
| 2002/0013727 A1 | 1/2002 | Lee | |
| 2002/0016769 A1 | 2/2002 | Barbara et al. | |
| 2002/0017561 A1 | 2/2002 | Tomoike | |
| 2002/0025797 A1 | 2/2002 | Joao et al. | |
| 2002/0035539 A1 | 3/2002 | O'Connell | |
| 2002/0046189 A1 | 4/2002 | Morita et al. | |
| 2002/0059146 A1 | 5/2002 | Keech | |
| 2002/0072925 A1 | 6/2002 | Krim | |
| 2002/0087471 A1 | 7/2002 | Ganesan et al. | |
| 2002/0091538 A1 | 7/2002 | Schwartz et al. | |
| 2002/0111904 A1 | 8/2002 | Gruber et al. | |
| 2002/0111907 A1 | 8/2002 | Ling | |
| 2002/0111908 A1 | 8/2002 | Milberger et al. | |
| 2002/0120582 A1 | 8/2002 | Elston et al. | |
| 2002/0193094 A1 | 12/2002 | Lawless et al. | |
| 2003/0023505 A1 | 1/2003 | Eglen et al. | |
| 2003/0050854 A1 | 3/2003 | Showghi et al. | |
| 2003/0065525 A1 | 4/2003 | Giacchetti et al. | |
| 2003/0119478 A1 | 6/2003 | Nagy et al. | |
| 2003/0125969 A1 | 7/2003 | Kizer et al. | |
| 2003/0126076 A1 | 7/2003 | Kwok | |
| 2003/0191711 A1 | 10/2003 | Jamison et al. | |
| 2003/0212601 A1 | 11/2003 | Silva et al. | |
| 2003/0220970 A1 | 11/2003 | Komsi | |
| 2004/0005911 A1 | 1/2004 | Guirauton et al. | |
| 2004/0019564 A1 | 1/2004 | Goldthwaite et al. | |
| 2004/0044582 A1 | 3/2004 | Chowdhary | |
| 2004/0064406 A1 | 4/2004 | Yates et al. | |
| 2004/0122685 A1 | 6/2004 | Bunce | |
| 2004/0185827 A1 | 9/2004 | Parks | |
| 2004/0230527 A1 | 11/2004 | Hansen et al. | |
| 2004/0248596 A1 | 12/2004 | Panchal | |
| 2004/0252814 A1 | 12/2004 | Eakin | |
| 2004/0254868 A1 | 12/2004 | Kirkland et al. | |
| 2005/0055296 A1 | 3/2005 | Hattersley et al. | |
| 2005/0055309 A1 | 3/2005 | Williams et al. | |
| 2005/0086164 A1 | 4/2005 | Kim et al. | |
| 2005/0144020 A1 | 6/2005 | Muzaffar et al. | |
| 2005/0177442 A1 | 8/2005 | Sullivan et al. | |
| 2005/0177517 A1 | 8/2005 | Leung et al. | |
| 2005/0197892 A1 | 9/2005 | Bilibin et al. | |
| 2005/0199709 A1 | 9/2005 | Linlor | |
| 2005/0245257 A1 | 11/2005 | Woodhill | |
| 2006/0018450 A1 | 1/2006 | Sandberg-Diment | |
| 2006/0030354 A1 | 2/2006 | Ho et al. | |
| 2006/0041505 A1 | 2/2006 | Enyart | |
| 2006/0116938 A1 | 6/2006 | Findling et al. | |
| 2006/0121880 A1 | 6/2006 | Cowsar et al. | |
| 2006/0131390 A1 | 6/2006 | Kim | |
| 2006/0206709 A1 | 9/2006 | Labrou et al. | |
| 2006/0248011 A1 | 11/2006 | Hecht-Nielsen et al. | |
| 2006/0253335 A1 | 11/2006 | Keena et al. | |
| 2006/0258331 A1 | 11/2006 | Syrett et al. | |
| 2006/0258397 A1 | 11/2006 | Kaplan et al. | |
| 2006/0259438 A1 | 11/2006 | Randle et al. | |
| 2006/0276171 A1 | 12/2006 | Pousti | |
| 2006/0294025 A1 | 12/2006 | Mengerink | |
| 2007/0005467 A1 | 1/2007 | Haigh et al. | |
| 2007/0011104 A1 | 1/2007 | Leger et al. | |
| 2007/0022019 A1 | 1/2007 | Sherwin et al. | |
| 2007/0027775 A1 | 2/2007 | Hwang | |
| 2007/0027803 A1 | 2/2007 | Brandes et al. | |
| 2007/0043664 A1 | 2/2007 | Wilkes | |
| 2007/0055440 A1 | 3/2007 | Denker et al. | |
| 2007/0061244 A1 | 3/2007 | Ramer et al. | |
| 2007/0063017 A1 | 3/2007 | Chen et al. | |
| 2007/0094080 A1 | 4/2007 | Wilken | |
| 2007/0100651 A1 | 5/2007 | Ramer et al. | |
| 2007/0118477 A1 | 5/2007 | Graves et al. | |
| 2007/0123219 A1 | 5/2007 | Lovell, Jr. | |
| 2007/0123229 A1 | 5/2007 | Pousti | |
| 2007/0124490 A1 | 5/2007 | Kalavade et al. | |
| 2007/0130025 A1 | 6/2007 | Nakajima | |
| 2007/0130044 A1 | 6/2007 | Rowan | |
| 2007/0133768 A1 | 6/2007 | Singh | |
| 2007/0150339 A1 | 6/2007 | Retter et al. | |
| 2007/0156517 A1 | 7/2007 | Kaplan et al. | |

(56) References Cited

U.S. PATENT DOCUMENTS

| | | |
|---|---|---|
| 2007/0168462 A1 | 7/2007 | Grossberg |
| 2007/0175978 A1 | 8/2007 | Stambaugh |
| 2007/0179792 A1 | 8/2007 | Kramer |
| 2007/0198338 A1 | 8/2007 | Heywood |
| 2007/0198354 A1 | 8/2007 | Senghore et al. |
| 2007/0198510 A1 | 8/2007 | Ebanks |
| 2007/0203792 A1 | 8/2007 | Rao |
| 2007/0203836 A1 | 8/2007 | Dodin |
| 2007/0208632 A1 | 9/2007 | Downes et al. |
| 2007/0233597 A1 | 10/2007 | Petersen et al. |
| 2007/0244731 A1 | 10/2007 | Barhydt et al. |
| 2007/0244811 A1 | 10/2007 | Tummianaro et al. |
| 2007/0250711 A1 | 10/2007 | Storey |
| 2007/0255653 A1 | 11/2007 | Tumminard et al. |
| 2007/0255662 A1* | 11/2007 | Tumminaro ............ 705/79 |
| 2007/0260556 A1 | 11/2007 | Pousti |
| 2007/0265921 A1 | 11/2007 | Rempe |
| 2007/0266034 A1 | 11/2007 | Pousti |
| 2007/0266130 A1 | 11/2007 | Mazur et al. |
| 2007/0270125 A1 | 11/2007 | Pousti |
| 2007/0287413 A1 | 12/2007 | Kleitsch et al. |
| 2008/0009263 A1 | 1/2008 | Pousti |
| 2008/0010192 A1 | 1/2008 | Rackley, III et al. |
| 2008/0033832 A1 | 2/2008 | Ho |
| 2008/0040139 A1 | 2/2008 | Pousti |
| 2008/0040265 A1* | 2/2008 | Rackley, III et al. ......... 705/40 |
| 2008/0040733 A1 | 2/2008 | Pousti |
| 2008/0051122 A1 | 2/2008 | Fisher |
| 2008/0052091 A1 | 2/2008 | Vawter |
| 2008/0052363 A1 | 2/2008 | Pousti |
| 2008/0057904 A1 | 3/2008 | Pousti |
| 2008/0058057 A1 | 3/2008 | Lau et al. |
| 2008/0065490 A1 | 3/2008 | Novick et al. |
| 2008/0071619 A1 | 3/2008 | Charlton et al. |
| 2008/0072406 A1 | 3/2008 | Sinclair |
| 2008/0082509 A1 | 4/2008 | Bessieres et al. |
| 2008/0091614 A1* | 4/2008 | Bas Bayod et al. ........... 705/71 |
| 2008/0097851 A1 | 4/2008 | Bemmel et al. |
| 2008/0103984 A1* | 5/2008 | Choe et al. ................. 705/76 |
| 2008/0109279 A1 | 5/2008 | Csoka |
| 2008/0120190 A1 | 5/2008 | Joao et al. |
| 2008/0120698 A1 | 5/2008 | Ramia |
| 2008/0126145 A1 | 5/2008 | Rackley, III et al. |
| 2008/0133403 A1 | 6/2008 | Hamzeh |
| 2008/0133735 A1 | 6/2008 | Thayer et al. |
| 2008/0140569 A1 | 6/2008 | Handel |
| 2008/0154727 A1 | 6/2008 | Carlson |
| 2008/0154772 A1* | 6/2008 | Carlson ........................ 705/44 |
| 2008/0160970 A1 | 7/2008 | Srinivas Reddy et al. |
| 2008/0167017 A1 | 7/2008 | Wentker et al. |
| 2008/0167961 A1* | 7/2008 | Wentker et al. ............. 705/14 |
| 2008/0172331 A1 | 7/2008 | Graves et al. |
| 2008/0177628 A1 | 7/2008 | Payette |
| 2008/0177661 A1 | 7/2008 | Mehra |
| 2008/0189186 A1 | 8/2008 | Choi et al. |
| 2008/0189211 A1 | 8/2008 | Obadia et al. |
| 2008/0201201 A1 | 8/2008 | Pousti |
| 2008/0208739 A1 | 8/2008 | Phillips |
| 2008/0228595 A1 | 9/2008 | Hill et al. |
| 2008/0233918 A1 | 9/2008 | Pousti |
| 2008/0262929 A1 | 10/2008 | Behr |
| 2008/0270300 A1 | 10/2008 | Jones et al. |
| 2008/0275779 A1 | 11/2008 | Lakshminarayanan |
| 2008/0279360 A1 | 11/2008 | Veenstra et al. |
| 2008/0281726 A1 | 11/2008 | Gupta |
| 2008/0287095 A1 | 11/2008 | Pousti |
| 2008/0288299 A1 | 11/2008 | Schultz |
| 2008/0288351 A1* | 11/2008 | Leung et al. ............... 705/14 |
| 2008/0307317 A1 | 12/2008 | Yohai-Giochais |
| 2009/0006184 A1 | 1/2009 | Leach et al. |
| 2009/0006217 A1 | 1/2009 | Smith |
| 2009/0006276 A1 | 1/2009 | Woolston |
| 2009/0024614 A1 | 1/2009 | Pousti |
| 2009/0029687 A1 | 1/2009 | Ramer et al. |
| 2009/0030838 A1 | 1/2009 | Jacob et al. |
| 2009/0044216 A1 | 2/2009 | McNicoll |
| 2009/0054031 A1 | 2/2009 | Smith et al. |
| 2009/0055292 A1 | 2/2009 | Chong et al. |
| 2009/0063178 A1 | 3/2009 | Pousti et al. |
| 2009/0063312 A1 | 3/2009 | Hurst |
| 2009/0070583 A1 | 3/2009 | Von Mueller et al. |
| 2009/0077640 A1 | 3/2009 | Wang |
| 2009/0081989 A1 | 3/2009 | Wuhrer |
| 2009/0104888 A1 | 4/2009 | Cox |
| 2009/0106138 A1 | 4/2009 | Smth et al. |
| 2009/0112765 A1 | 4/2009 | Skowronek |
| 2009/0112768 A1 | 4/2009 | Hammad et al. |
| 2009/0119190 A1 | 5/2009 | Realini |
| 2009/0124238 A1 | 5/2009 | Wilson |
| 2009/0150257 A1 | 6/2009 | Abrams et al. |
| 2009/0156170 A1 | 6/2009 | Rossano et al. |
| 2009/0157792 A1 | 6/2009 | Fiatal |
| 2009/0172402 A1 | 7/2009 | Tran |
| 2009/0177581 A1 | 7/2009 | Garcia et al. |
| 2009/0182634 A1 | 7/2009 | Park et al. |
| 2009/0182674 A1 | 7/2009 | Patel et al. |
| 2009/0192928 A1 | 7/2009 | Abifaker |
| 2009/0204546 A1 | 8/2009 | Haidar |
| 2009/0216687 A1 | 8/2009 | Burdick |
| 2009/0220060 A1 | 9/2009 | Wilson |
| 2009/0248483 A1 | 10/2009 | Kiefer |
| 2009/0265273 A1 | 10/2009 | Guntupali et al. |
| 2009/0281904 A1 | 11/2009 | Pharris |
| 2009/0313131 A1 | 12/2009 | Giordano |
| 2010/0010911 A1 | 1/2010 | Smith |
| 2010/0015944 A1 | 1/2010 | Smith |
| 2010/0015957 A1 | 1/2010 | Smith |
| 2010/0017285 A1 | 1/2010 | Smith |
| 2010/0049654 A1 | 2/2010 | Pilo |
| 2010/0057623 A1 | 3/2010 | Kapur |
| 2010/0070757 A1 | 3/2010 | Martinez |
| 2010/0094732 A1* | 4/2010 | Smith ........................... 705/30 |
| 2010/0100462 A1 | 4/2010 | Lyda et al. |
| 2010/0106620 A1 | 4/2010 | Marcus |
| 2010/0114775 A1 | 5/2010 | Griffen |
| 2010/0125514 A1 | 5/2010 | Blackhurst et al. |
| 2010/0125737 A1 | 5/2010 | Kang |
| 2010/0130162 A1 | 5/2010 | Yang |
| 2010/0130165 A1 | 5/2010 | Snyder et al. |
| 2010/0138344 A1 | 6/2010 | Wong et al. |
| 2010/0145802 A1 | 6/2010 | Nowacek et al. |
| 2010/0153249 A1* | 6/2010 | Yuan et al. .................. 705/34 |
| 2010/0174629 A1 | 7/2010 | Taylor et al. |
| 2010/0179907 A1 | 7/2010 | Atkinson |
| 2010/0190471 A1 | 7/2010 | Smith |
| 2010/0191646 A1 | 7/2010 | Smith |
| 2010/0191648 A1 | 7/2010 | Smith |
| 2010/0216425 A1 | 8/2010 | Smith |
| 2010/0217696 A1 | 8/2010 | Schuba et al. |
| 2010/0223110 A1 | 9/2010 | Slavin et al. |
| 2010/0223183 A1 | 9/2010 | Smith |
| 2010/0228580 A1 | 9/2010 | Zoldi et al. |
| 2010/0235276 A1 | 9/2010 | Smith |
| 2010/0250359 A1 | 9/2010 | Gillenson et al. |
| 2010/0250687 A1 | 9/2010 | Smith |
| 2010/0267362 A1 | 10/2010 | Smith et al. |
| 2010/0293065 A1 | 11/2010 | Brody et al. |
| 2010/0299220 A1 | 11/2010 | Baskerville |
| 2010/0299731 A1 | 11/2010 | Atkinson |
| 2010/0306015 A1 | 12/2010 | Kingston |
| 2010/0306099 A1 | 12/2010 | Hirson |
| 2010/0306832 A1 | 12/2010 | Mu et al. |
| 2010/0312645 A1 | 12/2010 | Niejadlik |
| 2010/0312678 A1 | 12/2010 | Davis |
| 2011/0010292 A1* | 1/2011 | Giordano et al. ............ 705/39 |
| 2011/0022484 A1 | 1/2011 | Smith et al. |
| 2011/0035240 A1 | 2/2011 | Joao et al. |
| 2011/0035264 A1 | 2/2011 | Zaloom |
| 2011/0065418 A1 | 3/2011 | Ryu et al. |
| 2011/0071922 A1 | 3/2011 | Hirson et al. |
| 2011/0072039 A1 | 3/2011 | Tayloe |
| 2011/0078077 A1 | 3/2011 | Hirson |
| 2011/0082767 A1 | 4/2011 | Ryu et al. |
| 2011/0082772 A1 | 4/2011 | Hirson |

(56) References Cited

U.S. PATENT DOCUMENTS

| | | | |
|---|---|---|---|
| 2011/0106618 | A1 | 5/2011 | Ben-Moshe |
| 2011/0125610 | A1 | 5/2011 | Goodsall et al. |
| 2011/0131106 | A1 | 6/2011 | Eberstadt et al. |
| 2011/0143710 | A1 | 6/2011 | Hirson |
| 2011/0143711 | A1 | 6/2011 | Hirson |
| 2011/0196926 | A1 | 8/2011 | Crawford |
| 2011/0213671 | A1 | 9/2011 | Hirson et al. |
| 2011/0237232 | A1 | 9/2011 | Hirson et al. |
| 2011/0287748 | A1 | 11/2011 | Angel et al. |
| 2011/0295750 | A1 | 12/2011 | Rammal |
| 2011/0320291 | A1 | 12/2011 | Coon |
| 2012/0036018 | A1 | 2/2012 | Feliciano et al. |
| 2012/0143768 | A1 | 6/2012 | Hammad et al. |
| 2012/0158580 | A1 | 6/2012 | Eram et al. |
| 2012/0171990 | A1 | 7/2012 | Williams et al. |
| 2012/0239479 | A1 | 9/2012 | Amaro et al. |
| 2012/0323737 | A1 | 12/2012 | Pousti et al. |

FOREIGN PATENT DOCUMENTS

| | | |
|---|---|---|
| GB | 2379525 | 3/2003 |
| JP | 2007109014 | 4/2007 |
| JP | 2007179383 | 7/2007 |
| KR | 20000036574 | 7/2000 |
| KR | 20030030684 | 4/2003 |
| KR | 20060103797 | 10/2006 |
| KR | 20070051817 | 5/2007 |
| KR | 20070103650 | 10/2007 |
| KR | 20080011338 | 2/2008 |
| WO | 9738538 | 10/1997 |
| WO | WO-2007004792 | 1/2007 |
| WO | WO-2007084593 | 7/2007 |
| WO | 2007102648 | 9/2007 |
| WO | 2007127521 | 11/2007 |
| WO | 2008/033960 A2 | 3/2008 |
| WO | 2008/061151 | 5/2008 |
| WO | 2009/036511 | 3/2009 |
| WO | 2009044396 | 4/2009 |

OTHER PUBLICATIONS

Aradiom Inc., "The Real Solution—Aradiom SolidPass", located at http://www.aradiom.com/SolidPass/2fa-OTP-security-token.htm, available at least by Apr. 24, 2009.
Chua, Lye Heng, "How Customers Applied Java CAPS?" Sun Microsystems, Inc. presentation, Nov. 6, 2007.
Hassinen, Marko et al., "An Open, PKI-Based Mobile Payment System," Emerging Trends in Information and Communication Security, Lecture Notes in Computer Science, vol. 3995/2006, pp. 86-89, Jun. 1, 2006.
International Application No. PCT/US2009/033823, International Search Report and Written Opinion, Sep. 24, 2009.
International Application No. PCT/US2009/039723, International Search Report and Written Opinion, Oct. 30, 2009.
International Application No. PCT/US2010/020189, International Search Report and Written Opinion, Dec. 10, 2010.
International Application No. PCT/US2010/021054, International Search Report and Written Opinion, Jul. 29, 2010.
International Application No. PCT/US2010/024525, International Search Report and Written Opinion, May 17, 2010.
International Application No. PCT/US2010/024535, International Search Report and Written Opinion, May 25, 2010.
International Application No. PCT/US2010/030338, International Search Report & Written Opinion, Jun. 3, 2010.
International Application No. PCT/US2010/032668, International Search Report and Written Opinion, Jul. 1, 2010.
International Application No. PCT/US2010/036940, International Search Report and Written Opinion, Jul. 21, 2010.
International Application No. PCT/US2010/037816, International Search Report and Written Opinion, Aug. 5, 2010.
International Application No. PCT/US2010/042703, International Search Report and Written Opinion, Sep. 13, 2010.
International Application No. PCT/US2010/046266, International Search Report and Written Opinion, Oct. 20, 2010.
International Application No. PCT/US2010/057472, International Search Report and Written Opinion, Jan. 18, 2011.
International Application No. PCT/US2010/059295, International Search Report and Written Opinion, Feb. 1, 2011.
International Application No. PCT/US2010/059466, International Search Report and Written Opinion, Feb. 1, 2011.
International Application No. PCT/US2011/022419, International Search Report and Written Opinion, Mar. 29, 2011.
International Application No. PCT/US2011/022426, International Search Report and Written Opinion, Mar. 28, 2011.
Mobilians Co. Ltd., company website located at http://www.mobilians.co.kr/english/, available at least by Jan. 12, 2009.
PayPal, Inc., "Get What You Want, When You Want It," located at https://www.paypal.com/cgi-bin/webscr?cmd=xpt/Marketing/mobile/MobileBuyStuff-outside, available at least by Mar. 5, 2009.
PayPal, Inc., "Texting with PayPal—Easy as Lifting a Finger," located at https://www.paypal.com/cgi-bin/webscr?cmd=xpt/Marketing/mobile/MobileAdvancedFeatures-outside, available at least by Mar. 5, 2009.
Squidoo, LLC, "Introducing MobillCash: Make a Secure Sale Even When an Online Customer Has No Cash, Credit Cards or I.D.," located at http://www.squidoo.com/mobillcash-pay-by-mobile-phone, available at least by Aug. 29, 2008.
Sun Microsystems Inc., "The Road to Mobile Banking," white paper, Jun. 2008.
Tindal, Suzanne, "St. George Counts Down to Two-Factor Authentication," ZDNet Australia, Feb. 19, 2008.
Trusted Mobile Payment Framework, "Scheme Rules," version 2.0, Aug. 6, 2008.
VISUALtron Software Corporation, "2-Factor Authentication—What is MobileKey?" located at http://www.visualtron.com/products_mobilekey.htm, available at least by 2008.
Wikimedia Foundation, Inc., "Authentication," located at en.wikipedia.org/wiki/Authentication, Mar. 17, 2009.
Wikimedia Foundation, Inc., "Credit Card," located at en/wikipedia.org/wiki/Credit_card, Dec. 5, 2008.
Wikimedia Foundation, Inc., "Security Token," located at en.wikipedia.org/wiki/Security_token, Apr. 13, 2009.
Wikimedia Foundation, Inc., "Two-Factor Authentication," located at en.wikipedia.org/wiki/Two-factor_authentication, Apr. 24, 2009.
Zabawskyj, Bohdan, "In the Media: The Mobile Money Opportunity," Billing World and OSS Today, located at http://www.redknee.com/news_events/in_the_media/43/?PHPSESSID=1e0ca1ab057bf9dc2c88104877ca8010, Sep. 2007.
International Preliminary Report on Patentability, International Application No. PCT/US12/25195, filed Feb. 15, 2012.
Ching, Andrew T. et al., "Payment card rewards programs and consumer payment choice", Journal of Banking & Finance, vol. 34, Issue 8, http://dx.doi.org/10.1016/j.jbankfin.2010.03.015. (http://www.sciencedirect.com/science/article/pii/S0378426610001196), ISSN 0378-4266, Aug. 2010, pp. 1773-1787.
Garry, Michael, "Ending the paper chase", Progressive Grocer, May 1994.
National Consumers League, "Mobile commerce: what's all the buzz?", http://www.nclnet.org/personal-finane/60-mobile-commerce/314-mobile-commerce-what . . . , Mar. 3, 2007.
Verizon, , "Ring Tones & Ringback Tones—Terms and Conditions", http://support.verizonwireless.com/terms/products/ringtones_ringbacktones.html, May 6, 2009.
International Application No. PCT/US2011/029760, International Search Report and Written Opinion, Oct. 28, 2011.
International Application No. PCT/US2011/051094, International Search Report and Written Opinion, Dec. 23, 2011.
International Application No. PCT/US12/25195, International Filing Date Feb. 15, 2012, International Search Report and Written Opinion, Apr. 26, 2012.
International Patent Application No. PCT/US11/51094 filed on Sep. 9, 2011, International Preliminary Report on Patentability mailed on Nov. 2, 2012.

(56) References Cited

OTHER PUBLICATIONS

Extended European Search Report mail on Jun. 11, 2015, European Patent Application No. 11737516.2, (8 pages).
Andrade, Eduardo B. et al., "Self-Disclosure on the Web: The Impact of Privacy Policy, Reward, and Company Reputation", Advances in Consumer Research (vol. 29), 2002, (pp. 350-353).
Green Zap, , "GreenZap Introduces New "Buy Now" Buttons, Enabling Merchants to Accept Payments as No Cost", Business Wire, PQ Dialog#445190533, Aug. 4, 2006, (4 pages).
greenzap.com Merchant Tools, , "Internet Archive Wayback Machine", 2006, (2 pages).
Lu, Gang , "Premium SMS Billing Vs. WAP Billing", URL:http://technode.com/2006/03/31preimum-sms-billing-vs-wap-billing/, Mar. 31, 2006, (7 pages).
European Patent Application No. 09711520.8, Extended Search Report mailed Apr. 27, 2011.
International Application No. PCT/US2010/050616, International Search Report and Written Opinion, Apr. 26, 2011.
International Application No. PCT/US2011/30039, International Search Report and Written Opinion, May 23, 2011.
International Application No. PCT/US2011/30038, International Search Report and Written Opinion, May 25, 2011.
OneBip S.R.L , "Onebip—to Pay Online with Your Mobile Phone", Youtube online video at http://www.youtube.com/watch?v=RiEsMcc0tJY, May 23, 2007.
Arrington, Michael, "Mobile Payments Getting Traction on Social Networks but Fees are Sky High", Tech Crunch, located a http://techcrunch.com/2009/01/13mobile-payments-getting-traction-on-social-networks-but-fees-are-sky-high/., Jan. 13, 2009.
Brooks, Rod , "MobilCash:Worlds First in Mobile Payments", Youtube online video located at http://youtube.com/watch?v=j6Xv35qSmbg,. Oct. 12, 2007.
Bruene, Jim , "PayPal Launches on Facebook: Who Wants to be the First Bank?", located at http://www.netbanker.com/2007/06paypal_launches_on_facebook_who_wants_to_be_the_first_bank_on_facebook.hml., Jun. 22, 2007.
Chen, Will , "Gift Shop Credits Have Arrived", The Facebook Blog, located at gttp://blog.facebook.com/blog.php?post=36577782130, Oct. 31, 2008.
Federal Trade Commision, "Children's Online Privacy Protection Act (COPPA)", 15 U.S.C. §§ 6501-6506, Oct. 21, 1998.
Ihlwan, Moon , "In Korea, Cell Phones Get a New Charge", http://businessweek.com/globalbiz/content/mar2006/gb20060301_260288.htm, Mar. 1, 2006.
Lee, Jessica , "Payment Industry Perspectives: Q&A with Zong CEO David Marcus", http://www.insidefacebook.com/2009/05/19payment-industry-perspectives-qa-with-zong-ceo-david-marcus/, May 19, 2009.
Nicole, Kristen , "Pay me Lets You Send and Receive Money Through Facebook ", http://mashable.com/2007/06/17pay-me-facebook-app, Jun. 17, 2007.
Zong, Inc., , "Virtual Goods/Currency and Mobile Payments: The Business Model for Social Apps", The Zong Blog at http://blog-zong.com/2008/10/25/virtual-goods-currency-and-mobile-payments-the business-model-for-social-apps/, Oct. 28, 2008.
Zong, Inc., , "Zong Mobile Payment Demo on a Facebook App", You Tube online video at http://www.youtube.com/watch?v=aLjRcAFrGil, Jan. 5, 2009.
Zong, Inc., , "Zong—Mobile Payments for Your Web App", You tube online video at http://www.youtube.com/watch?v=O2C3SQraAvQ, Sep. 5, 2008.
Zong, Inc., , "Zong Mobile Payments in Smallworlds", You Tube online video at http://www.youtube.com/watch?v=Y6CEw3tSgBc, Feb. 10, 2009.

\* cited by examiner

SYSTEMS AND METHODS TO ACCELERATE TRANSACTIONS

CROSS-REFERENCE TO RELATED APPLICATIONS

The present application claims priority to provisional U.S. Patent Application Ser. No. 61/231,302, filed Aug. 4, 2009 and entitled "Systems and Methods to Schedule Transactions," the disclosure of which is incorporated herein by reference.

FIELD OF THE TECHNOLOGY

At least some embodiments of the disclosure relate to mobile communications in general and, more particularly but not limited to, mobile communications to facilitate online transactions.

BACKGROUND

Short Message Service (SMS) is a communications protocol that allows the interchange of short text messages between mobile telephone devices. SMS messages are typically sent via a Short Message Service Center (SMSC) of a mobile carrier, which uses a store-and-forward mechanism to deliver the messages. When a mobile telephone is not reachable immediately for the delivery of the message, the SMSC stores the message for later retry.

SMS messages can be sent via gateways. Some gateways function as aggregators. An aggregator typically does not have the capacity to deliver the messages directly to mobile phones. An aggregator typically interfaces with and relies upon the SMSC of a mobile carrier to deliver SMS messages.

Some gateways function as providers that are capable of sending text messages to mobile devices directly, without going through the SMSC of other mobile operators.

Text messaging between mobile telephones can also be performed using other protocols, such as SkyMail and Short Mail in Japan.

Some mobile carriers provide email gateway services to allow text messages to be sent to mobile phones via email. For example, a non-subscriber of the mobile carrier may send a message to an email address associated with a mobile phone of a subscriber of the mobile carrier to have the message delivered to the mobile phone via text messaging.

Emails can also be sent to mobile telephone devices via standard mail protocols, such as Simple Mail Transfer Protocol (SMTP) over Internet Protocol Suite (commonly TCP/IP, named from two of the protocols: the Transmission Control Protocol (TCP) and the Internet Protocol (IP)).

Short messages may be used to provide premium services to mobile phones, such as news alerts, ring tones, etc. The premium content providers may send the messages to the SMSC of the mobile operator using a TCP/IP protocol, such as Short Message Peer-to-Peer Protocol (SMPP) or Hypertext Transfer Protocol, for delivery to a mobile phone; and the mobile phone is billed by the mobile operator for the cost of receiving the premium content.

Premium services may also be delivered via text messages initiated from the mobile phone. For example, a televoting service provider may obtain a short code to receive text messages from mobile phones; and when the user sends a text message to the short code, the mobile carrier routes the message to the televoting service provider and charges the user a fee, a portion of which is collected for the televoting service provider.

SUMMARY OF THE DESCRIPTION

Systems and methods are provided to accelerate transactions made via mobile communications. Some embodiments are summarized in this section.

In one aspect, a system includes: a memory to store transaction records indicating actual amounts of funds collected via a first plurality of premium messages transmitted to a first plurality of phone numbers; and a processor coupled with the memory to transmit, to a second plurality of phone numbers, a second plurality of premium messages to collect payments on behalf of a merchant. Before funds collected via the second premium messages become available, the processor identifies a portion of a total amount of funds charged via the second premium messages, based at least in part on the transaction records stored in the memory, and offers to provide the portion to the merchant.

In another aspect, a computer implemented method includes: transmitting, to a plurality of first phone numbers, a plurality of first premium messages by a computer to collect payments via one or more telecommunication carriers of the first phone numbers; storing, by the computer in a data storage facility, records of funds collected based on one or more of the first premium messages; transmitting, to a plurality of second phone numbers, a plurality of second premium messages by the computer to collect payments on behalf of a merchant; and prior to one or more telecommunication carriers of the second phone numbers providing funds according to the second premium messages transmitted to the second phone numbers, identifying by the computer a portion of a total amount of funds charged via the second premium messages, based at least in part on the records of funds collected based on the one or more the first premium messages. The merchant is offered to receive the portion prior to the one or more telecommunication carriers of the second phone numbers providing funds according to the second premium messages transmitted to the second phone numbers.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, an interchange is used to interface with a plurality of different controllers of mobile communications, such as SMS messages. The interchange can be used to associate account information with phone numbers to facilitate electronic payments via mobile devices, such as mobile phones or cellular phones. The interchange is configured to communicate with the mobile phones through the different controllers to provide security and convenience for online transactions.

Figure 1:
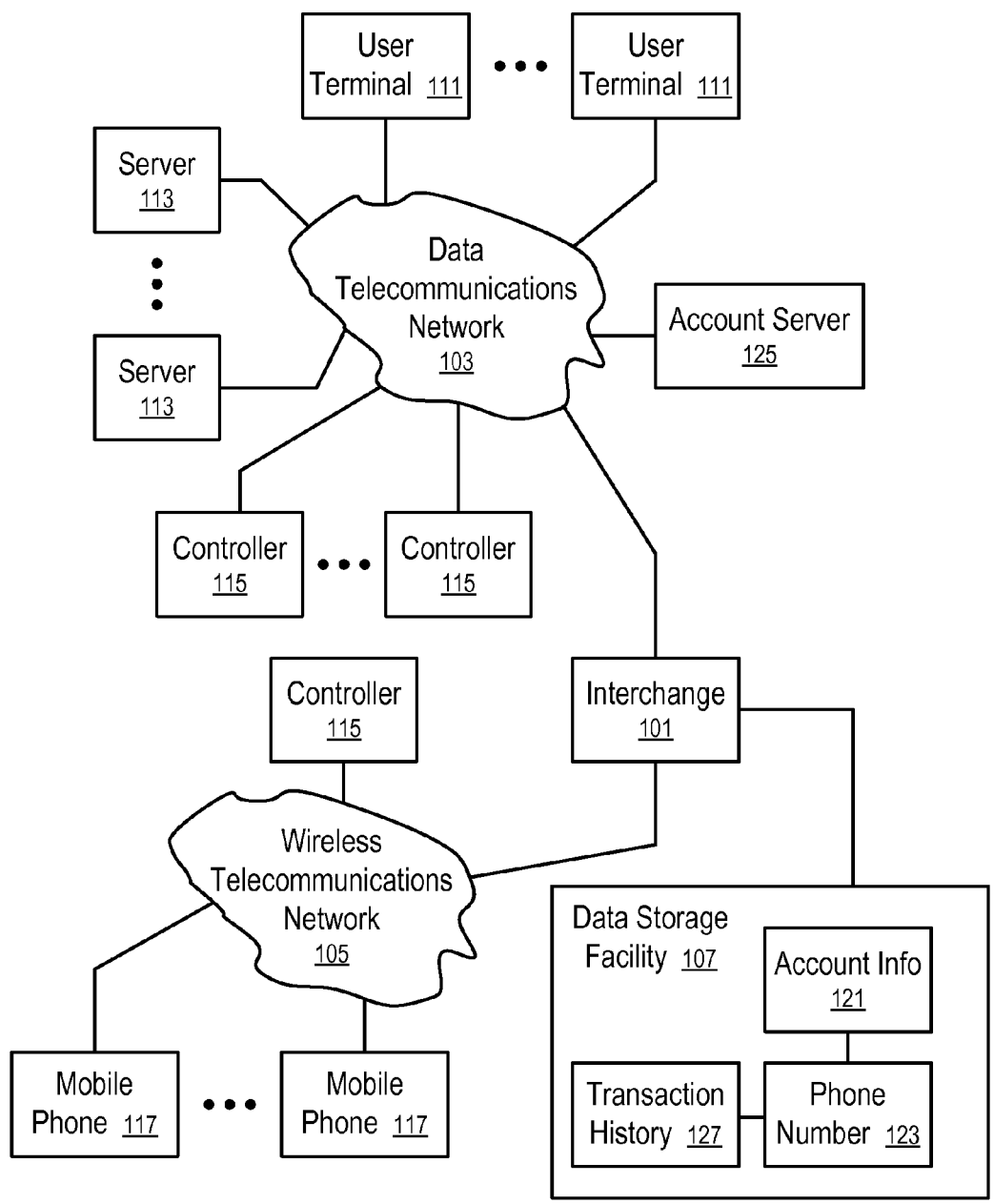
FIG. 1 shows a system to facilitate online transactions according to one embodiment.

FIG. 1 shows a system to facilitate online transactions according to one embodiment. In FIG. 1, an interchange (101) is provided to interface with a plurality of different controllers (115) for communications with the mobile phones (117) over the wireless telecommunications network (105).

In FIG. 1, a data storage facility (107) stores user account information (121) and the corresponding phone numbers (123) of the mobile phones (117). The interchange (101) is coupled with the data storage facility (107) to communicate with the mobile phones (117) at the corresponding phone numbers (123) to confirm operations that are performed using the account information (121). Since the account information (121) is secured by the interchange (101), the account information (121) can be used to pay for products and services offered by the servers (113) of various merchants, without being revealed to the merchants.

In one embodiment, the server (113) offers products and/or services adapted for a virtual world environment, such as an online game environment, a virtual reality environment, etc. The products may be virtual goods, which can be delivered via the transmission of data or information (e.g., without having to physically deliver an object to the user). For example, the virtual goods may be a song, a piece of music, a video clip, an article, a computer program, a decorative item for an avatar, a piece of virtual land in a virtual world, a virtual object in a virtual reality world, etc. For example, an online game environment hosted on a server (113) may sell services and products via points or virtual currency, which may be consumed by the user while engaging in a game session. For example, a virtual reality world hosted on a server (113) may have a virtual currency, which may be used by the residents of the virtual reality world to conduct virtual commerce within the virtual reality world (e.g., buy virtual lands, virtual stocks, virtual objects, services provided in the virtual reality world, etc.). In other embodiments, the server (113) may also offer physical goods, such as books, compact discs, photo prints, postcards, etc.

In FIG. 1, the interchange (101) may communicate with different controllers (115) of mobile communications via different networks (e.g., 105 and 103) and/or protocols. The interchange (101) processes the requests in a common format and uses a set of converters for communications with the different controllers (115) respectively.

For example, the controllers (115) may be different aggregators, providers and/or SMSCs of different mobile carriers. Based on the phone numbers (123), the interchange (101) interfaces with the corresponding controllers (115) to communicate with the mobile phones (117) via text messaging to confirm the operations related to the corresponding account information (121), such as bank accounts, credit card numbers, charge card numbers, etc.

In FIG. 1, the user terminals (111) may use a unified interface to send requests to the interchange (101). For example, a web site of the interchange (101) may be used to receive the account information (121) from the web browsers running in the user terminals (111). The user terminals (111) are typically different from the mobile phones (117). However, in some embodiments, users may use the mobile phone (117) to access the web and submit the account information (121). Alternatively, the users may use the mobile phone (117) to submit the account information (121) to the interchange (101) via text messaging, email, instant messaging, etc.

The use of the mobile phones (117) in the confirmation of activities that involve the account information (121) increases the security of the transaction, since the mobile phones (117) are typically secured in the possession of the users.

Further, in one embodiment, the interchange (101) may use the phone bills of the mobile phones (117) to pay for purchases, in order to use the account information (121) to pay for the phone bills, and/or to deposit funds into the accounts identified by the account information (121) by charging on the phone bills of the corresponding mobile phones (117). In some embodiments, the accounts identified by the account information (121) are hosted on the data storage facility (107). In other embodiments, the accounts are hosted on the account servers (125) of financial institutions, such as banks, credit unions, credit card companies, etc.

In one embodiment, once the account information (121) is associated with the mobile phones (117) via their phone numbers (123) stored in the data storage facility (107), the users may use the user terminals (111) to access online servers (113) of various merchants or service providers to make purchases. From the user terminals (111), the users can use the accounts identified by the account information (121) to make the payment for the purchases, without revealing their account information (121) to the operators of the servers (113).

In one embodiment, the mobile phones (117) are used by the corresponding users to make payments and/or manage funds, such as for making purchases on various websites hosted on the servers (113) of merchants and service providers and/or for transferring funds to or from an account identified by the account information (121), such as phone bills for land-line telephone services, credit card accounts, debit card accounts, bank accounts, etc., or an account hosted on the data storage facility (107) or telecommunication accounts of the mobile phones (117) with telecommunication carriers. The mobile phones (117) are used to confirm and/or approve the transactions associated with the account identified by the account information (121) (or other accounts). The interchange (101) interfaces the mobile phones (117) and the servers (113) to confirm and/or approve transactions and to operate on the account identified by the account information (121) (and/or other accounts associated with the phone number (123)).

For example, the user terminal (111) may provide the phone number (123) to the servers (113) to allow the servers (113) to charge the account identified by the account information (121) associated with the phone number (123). The interchange (101) sends a message to the mobile phone (117) via the phone number (123) to confirm the payment request. Once the payment is confirmed or approved via the corresponding mobile phone (117), the interchange (101) charges the account identified by the account information (121) (e.g., by communicating with the account server (125) on which the corresponding accounts are hosted) and pays the server (113) on behalf of the user, using the funds obtained from the corresponding account identified by the account information (121).

In one embodiment, the user terminal (111) may not even provide the phone number (123) to the server (113) to process the payment. The server (113) may redirect a payment request to the interchange (101), which then prompts the user terminal (111) to provide the phone number (123) to the web site of the interchange (101) to continue the payment process.

For example, the server (113) may redirect the payment request to the web site of the interchange (101) with a reference indicating the purchase made via the user terminal (111). The interchange (101) can use the reference to subsequently complete the payment with the server (113) for the purchase, after receiving the phone number (123) directly from the user terminal (111) to confirm the payment via the mobile phone (117).

In some embodiments, instead of directly providing the phone number (123) to identify the account information (121), the user may provide other information to identify the phone number (123), such as an account identifier of the user assigned to the user for obtaining the services of the interchange (101).

In one embodiment, the account information (121) is pre-associated with the phone number (123) prior to the payment request. The account information (121) may be submitted to the interchange (101) via the user terminal (111) or the mobile phone (117) via a secure connection.

Alternatively, the user may supply the account information (121) to the interchange (101) at the time the payment request is submitted from the user terminal (111) to the interchange (101). Alternatively, the user may supply the account information (121) to the interchange (101) at the time the user responds to the confirmation message for the payment request.

In some embodiments, the user may supply the account information (121) after a transaction using funds collected via the telecommunication carrier of the mobile phone (117) at the phone number (123). For example, after the transaction, the interchange (101) may send an invitation message, such as a text message to the mobile phone (117) at the phone number (123), to the user to invite the user to register with the interchange (101) and provide the account information (121). The user may register with the interchange (101) via the mobile phone (117) (e.g., by a replying text message), or via a web page of the interchange (101) (e.g., using a link and/or a unique code provided in the invitation message).

After the user registers with the interchange (101) (e.g., via the mobile phone (117) and by providing the account information (121)), the user may create a customized personal identification number (PIN) or receive a PIN for enhanced security. Using the PIN, the user may use the account information (121) to complete an online transaction without having to confirm and/or approve a transaction using the mobile phone (117). In some embodiments, the PIN may be used to reduce unwanted messages to the mobile phone (117). For example, once the phone number (123) and the account information (121) are associated with a PIN, the interchange (101) may require the user of the user terminal (111) to provide the correct PIN to initiate the payment process. Thus, a spammer having only the phone number (123) (or a different user mistakenly using the phone number (123)) may not successfully use the user terminal (111) to request the interchange (101) to send confirmation messages to the mobile phone (117) protected by the PIN. In some embodiments, the interchange (101) may offer further incentives to the user for registering with the interchange (101), such as reduced fees, discounts, coupons, free products and services, etc.

In one embodiment, once the account information (121) is associated with the phone number (123) in the data storage facility (107), the user does not have to resubmit the account information (121) in subsequent payment requests.

By delegating the payment task to the interchange (101) and securing the account information (121) in the data storage facility (107), the system as shown in FIG. 1 can increase the security of using the account information (121) in an online environment.

In some embodiments, the interchange (101) can also fulfill the payment requests using the funds collected via the phone bill of the phone numbers (123). The interchange (101) can collect the funds via sending premium messages to the mobile phones (117) at the phone numbers (123), after receiving confirmation from the mobile phone (117).

For example, after the confirmation or approval message is received from the mobile phone (117), the interchange (101) performs operations to collect funds via the phone bill of the phone number (123). The interchange (101) may calculate the required premium messages to bill to the mobile phone (117). For example, mobile terminated premium SMS messages may have a predetermined set of prices for premium messages. The interchange (101) determines a combination of the premium messages that has a price closest to the amount required by the transaction, and sends this combination of premium messages to the mobile phone (117). For example, mobile originated premium SMS messages may also have a predetermined set of prices for premium messages. The interchange (101) can calculate the set of messages required for the transaction and transmit a text message to the mobile phone (117) of the user to instruct the user to send the required number of premium messages to provide the funds.

In one embodiment, the data storage facility (107) stores the transaction history (127) associated with the phone number (123) and uses the transaction history (127) to approve payment requests and to reduce the time period for processing a subsequent payment request.

For example, from the transaction history (127) the interchange (101) may identify a pattern of prior payment requests made via the phone number (123) and match subsequent requests with the identified pattern. When a subsequent request matches the pattern, the interchange (101) may skip the communication with the mobile phone (117) at the phone number (123), which communication is otherwise performed after the payment request and before the payment operation for payment confirmation and/or approval. Skipping such a communication between the payment request and the payment operation can reduce the time period for payment processing and improve user experience.

Examples of transaction patterns may include the use of individual user terminals (111), the typical time period of payment requests, range of payment amounts, and/or certain characteristics of payees, such as a collection of frequently used payees, payees who provide certain types of products or services, the geographical region of payees, etc.

In one embodiment, when the subsequent payment request is received within a predetermined time limit of a previous confirmed payment request from the same user terminal (111), the interchange (101) may approve the payment request without communicating with the mobile phone (117) at the phone number (123) for approval or confirmation.

In one embodiment, when the interchange (101) skips the communication with the mobile phone (117) at the phone number (123) for approval or confirmation and approves a transaction request based on the transaction history (127), the interchange (101) may send a notification message to the mobile phone (117) at the phone number (123) for enhanced security, but not require a response from the user. If the user determines that the notification message corresponds to an unauthorized use of the phone number (123), the user may reply to the notification message from the mobile phone (117) to report the unauthorized use and/or stop or reverse the payment operation.

In some embodiments, the user may start a session (e.g., a web session) authenticated using a password associated with the phone number (123) prior to the payment request. When the payment request is made within the authenticated session (e.g., before the user logs off the session, or before the session times out), the interchange (101) may skip the confirmation/approval communication with the mobile phone (117) at the phone number (123) to reduce the time period for payment processing.

In one embodiment, the session is authenticated via communications with the mobile phone (117) at the phone number (123). For example, after the user provides the phone number (123) to log into a session on a user terminal (111), the interchange (101) may generate a code (e.g., a code for one time use) and send the code to the user via the user terminal (111) (or the mobile phone (117) at the phone number (123)). The interchange (101) then requests the code back from the user via the mobile phone (117) at the phone number (123) (or the user terminal (111)), which is not used to send the code. When the code sent by the interchange (101) matches the code received back from the user, the association between the user terminal (111) and the mobile phone (117) at the phone number (123) can be established; and the identity of the user of the user terminal (111) can be confirmed. Such confirmation can be logged in the transaction history (127) for subsequent approval of payment requests.

In one embodiment, the user may specify a time period for the session, or the time period for the association between the user terminal (111) and the phone number (123). The user may specify the time period using the user terminal (111) when providing the phone number (123) to initiate the session, or specify the time period using the mobile phone (117) when providing the one-time code back to the interchange (101). During the time period of the confirmed association between the user terminal (111) and the phone number (123), a payment request from the user terminal (111) can be automatically identified with the phone number (123) without the user having to explicitly specify the phone number (123) for the payment request. Alternatively, for enhanced security and/or flexibility, the interchange (101) may require the user to identify the phone number (123) in the payment request, even though the payment request is from the user terminal (111) that is associated with the phone number (123).

In one embodiment, the code for the authentication of the session can be communicated to and/or from the mobile phone (117) via short message service (SMS), voice message, voice mail, or other services, such as email, instant messaging, multimedia messaging service (MMS), etc.

In one embodiment, after the user provides the phone number (123) to log into a session on a user terminal (111), the interchange (101) provides a message to the mobile phone (117) at the phone number (123) and receives a reply to the message from the mobile phone (117) within a predetermined period of time to authenticate the session and associate the user terminal (111) with the phone number (123). If the reply is not received from the mobile phone (117) with the predetermined period of time, the session is not authenticated.

In one embodiment, the user may provide an advance approval for subsequent payment requests to pay via the phone number (123). The advance approval may include a number of limitations, such as the time limit for the expiration of the advance approval, the budget limit for the advance approval, a limit on payees for the advance approval, etc. For example, the advance approval may limit the payees based on their business category, web address, product type, service type, geographic location, etc. For example, the budget limit may include the frequency of subsequent payment requests, limits for individual payment requests, and a total limit for subsequent payment requests, etc.

In one embodiment, the advance approval is specific for a user terminal. For example, the advance approval may be obtained via communications with the user via both a specific user terminal (111) and the mobile phone (117) at the phone number (123). Thus, the advance approval applies only to subsequent payment requests from the specific user terminal (111) identified by the advance approval.

Alternatively, the advance approval may not be limited to a specific user terminal (111). The advance approval may be used for any user terminals (111) used by the user of the phone number (123) to request payments via the phone number (123). In some embodiments, the advance approval is limited to user terminals (111) of certain characteristics identified by the advance approval, such as a geographic region of the user terminal (111) (e.g., determined based on the communication addresses, routing paths, access points for wireless connections, base stations for cellular communications, etc.). In some embodiments, the interchange (101) automatically identifies these characteristics based on the communications to obtain the advance approval (e.g., based on transaction history (127)), without the user explicitly specifying the characteristics.

Figure 2:
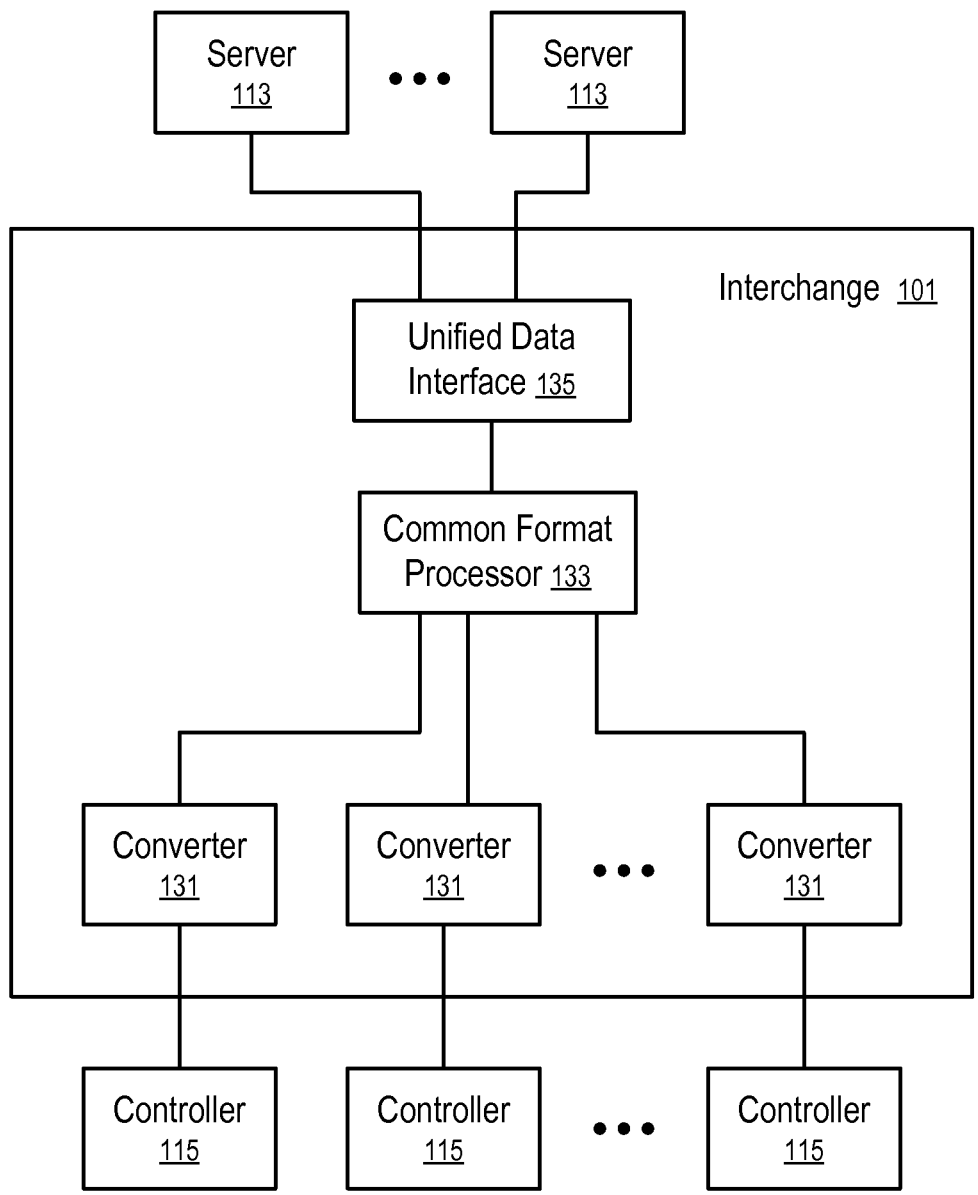
FIG. 2 shows an interchange to route messages according to one embodiment.

FIG. 2 shows an interchange to route messages according to one embodiment. In FIG. 2, the interchange (101) includes a unified data interface (135) for interaction with the servers (113). The servers (113) may redirect the payment requests to the interchange (101) to allow the interchange (101) to subsequently communicate with the user to process the payment request, including obtaining payment options and identifying user account information (121), before returning to communicating with the server (113). Alternatively, the servers (113) may collect account related information (e.g., the phone number of the user) to request payment from the interchange (101).

In FIG. 2, the interchange (101) includes a common format processor (133), which processes various payment options in a common format. In one embodiment, the common format processor (133) can handle the payments via mobile terminated text message, mobile originated text message, operator billing, credit card, stored value account, and other online payment options. The common format processor (133) determines the actual amount that is to be billed to the user, based on the payment options (e.g., mobile terminated premium SMS, mobile originated premium SMS, operator billing, credit cards, etc.), and selects a converter (131) to communicate with a corresponding controller (115).

Different converters (131) are configured to communicate with corresponding controllers (115) in different languages and protocols. The converters (131) perform the translation between the common format used by the common format processor (133) and the corresponding formats used by the controllers (115).

The use of the common format processor (133) simplifies the structure of the interchange (101) and reduces the development effort required for the interchange (101) to interface with the increasing number of different controllers, such as SMSC, mobile providers, aggregators, gateways, etc.

Figure 3:
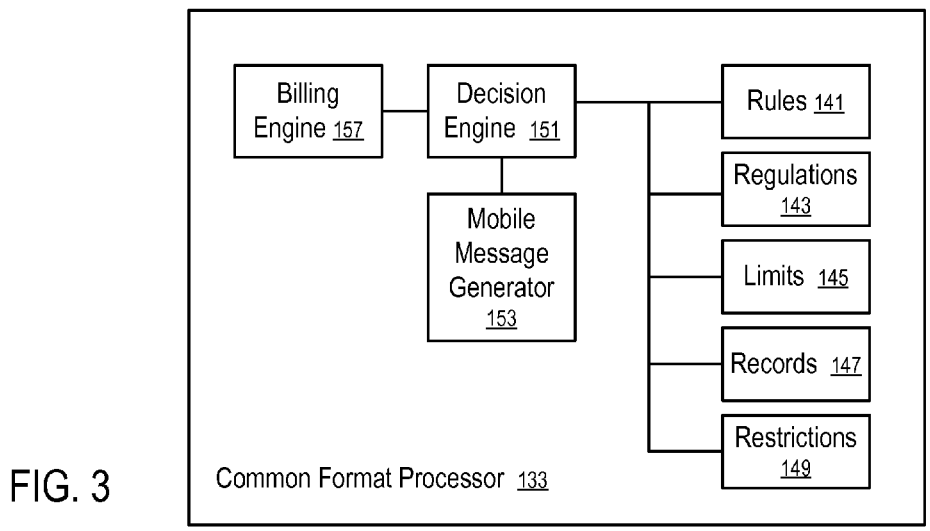
FIG. 3 shows a message processor according to one embodiment.

FIG. 3 shows a message processor according to one embodiment. In FIG. 3, the common format processor (133) includes a billing engine (157) that calculates the amount to be billed to the user, by adding or subtracting transaction costs for different billing methods, such as mobile terminated text message, mobile originated text message, operator billing, credit card, stored value account, and other online payment options.

In one premium message billing method, the interchange (101) sends mobile terminated premium SMS messages to the mobile phone (117) to bill the user, or requests the mobile phone (117) to send mobile originated premium SMS messages to a short code representing the interchange (101).

In one operator billing method, the interchange (101) directly sends a message to the mobile carrier of the mobile phone (117) to bill the amount on the phone bill of the mobile phone (117), without having to send a premium message to the mobile phone (117).

The common format processor (133) includes a decision engine (151) which decides how to generate a set of one or more messages to the mobile phone (117) based on a set of rules (141), regulations (143), limits (145), records (147) and restrictions (149).

For example, different countries have different regulations (143) governing mobile communications with the mobile phones (117). For example, different mobile carriers have different rules (141) regarding premium messages. For example, past transaction records (147) can be used to monitor the transactions to discover suspected fraudulent activities. For example, parental limits (145) and merchant restrictions (149) can be imposed.

Based on results of the decision engine (151), the mobile message generator (153) generates one or more messages to communicate with the mobile phone (117) about the transaction (e.g., a request to collect funds via the phone bill of the user for a payment request, or for deposit into an account identified by the account information (121)). The converter (131) then interfaces with the corresponding controller (115) to transmit the messages to the mobile phone (117).

Figure 4:
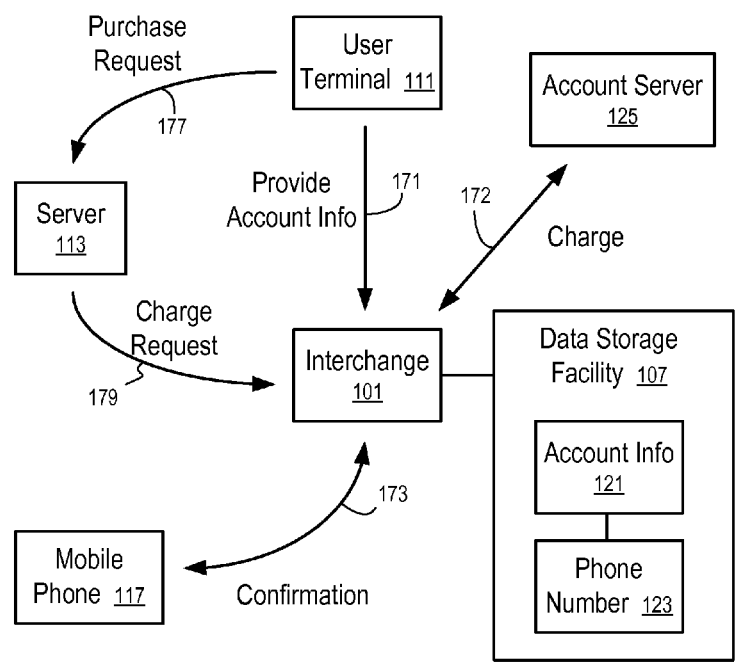
FIG. 4 shows a method to facilitate an online transaction using an interchange according to one embodiment.

FIG. 4 shows a method to facilitate an online transaction using an interchange according to one embodiment. In FIG. 4, the user terminal (111) provides (171) account information (121) to the interchange (101) for association with the phone number (123). For example, the user may use a device running a web browser as the user terminal (111) to submit the account information (121) via a secure web connection. The user terminal (111) is typically different from the mobile phone (117). However, in some embodiments, the mobile phone (117) may also be used as the user terminal (111) to submit the account information (121) (e.g., via a wireless application protocol (WAP) application, or via a message sent via short message service (SMS) or multimedia message service (MMS), or via an email message or an instant message).

After the user provides the account information (121) to the interchange (101) for storage in the data storage facility (107), the user can send (177) a charge request to the server (113) of a merchant from the user terminal (111). The server (113) of the merchant can send or redirect (179) the charge request to the interchange (101). In response to the charge request, the interchange (101) sends (173) a confirmation message to the mobile phone (117). If the user sends (173) an approval, or an appropriate reply, to the confirmation message from the mobile phone (117), the interchange (101) communicates with the account server (125) to charge an account of the user identified by the account information (121), without revealing the account information (121) to the server (113). The interchange (101) pays the merchant on behalf of the user using the funds collected via charging the account of the user. For example, the interchange (101) may use its own bank account to pay the merchant operating the server (113). Thus, the financial information of the user is not revealed to the merchant.

Upon the completion of the payment process, the interchange (101) can notify the user via the mobile phone (117) and/or the user terminal (111).

In some embodiments, the server (113) of the merchant redirects the charge request to allow the user terminal (111) to communicate with the interchange (101) to continue the payment process; and the user terminal (111) may provide (171) the account information (121) directly to the interchange (101) after the charge request is redirected.

In alternative embodiments, the user may provide the account information (121) from the mobile phone (117) together with the approval of the charge request.

In one embodiment, the interchange (101) communicates with the mobile phone (117) for the confirmation of the charge request via SMS messages. Alternatively, the confirmation and approval messages can be sent (173) via emails, instant messages, voice message, live calls from operators, etc.

In some embodiments, the user of the mobile phone (117) may choose to fulfill the charge request via the phone bill, instead of charging the account identified by the account information (121). Thus, after the confirmation, the interchange (101) sends the premium messages to the mobile phone (117) to collect funds via the phone bill of the mobile phone (117). In other embodiments, the interchange (101) may send an instruction with the confirmation message to the mobile phone (117) to instruct the user to send mobile originated premium messages to the interchange (101) to collect the funds via the phone bill of the mobile phone (117).

Figure 5:
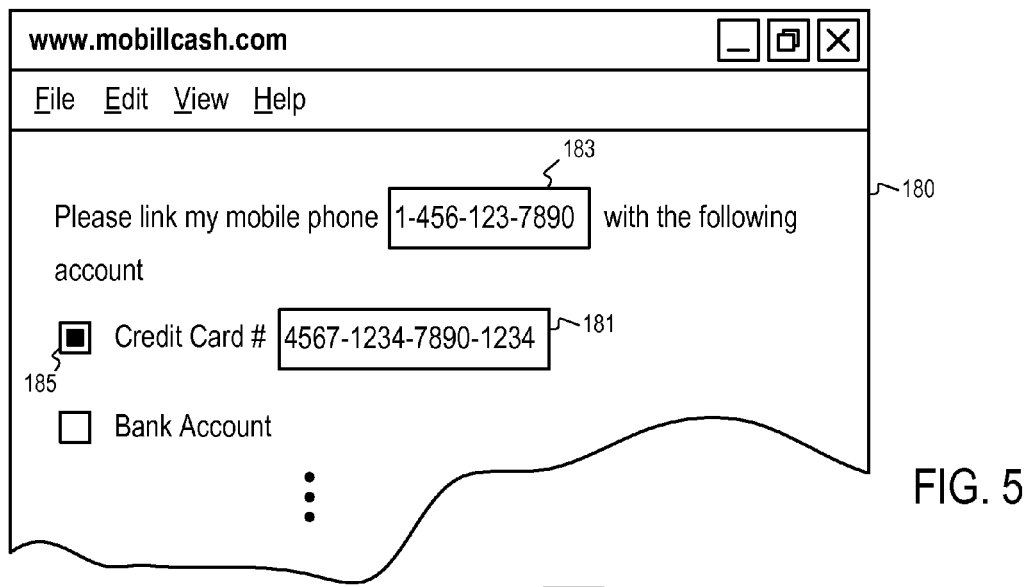
FIG. 5 illustrates a user interface to associate an account with a telephone number according to one embodiment.

FIG. 5 illustrates a user interface to associate an account with a telephone number according to one embodiment. In FIG. 5, the user interface (180) includes a text field (183) that allows the user to specify the phone number (123) with which the account information (121) provided in the text field (181) is to be associated.

In FIG. 5, the user interface (180) further includes an option list, which allows the user to select various types of accounts, such as credit card accounts, bank accounts, charge card accounts, etc. In the example illustrated in FIG. 5, the checkbox (185) is selected to specify a credit card account.

In some embodiments, the user interface (180) may further present a text field (not shown in FIG. 5) to allow the user to specify an alias for the account information (121) supplied in the text input field (181). For enhanced security, the alias can be used for subsequent communications with the user without revealing the account information (121).

In FIG. 5, the user interface (180) may be presented via a web browser (or a custom application) to submit account information (121) in the text input field (181) from a user terminal (111) to the interchange (101). Alternatively, the account number can be submitted from the mobile phone (117) via a message sent via SMS, WAP, voice mail, or via an interactive voice response (IVR) system.

In one embodiment, the server (113) presents the payment option (185) via an online shopping cart system or a third party checkout system. Alternatively, or in combination, the server (113) presents the payment option (185) via a web widget. For example, a web widget may include a program code that is portable and executable within a web page without requiring additional compilation. The web widget allows the user to select the option (185) to pay for the product and/or service without leaving the web page or refreshing the web page. In one embodiment, the interchange (101) provides the web widget to facilitate the payment processing.

Figure 6:
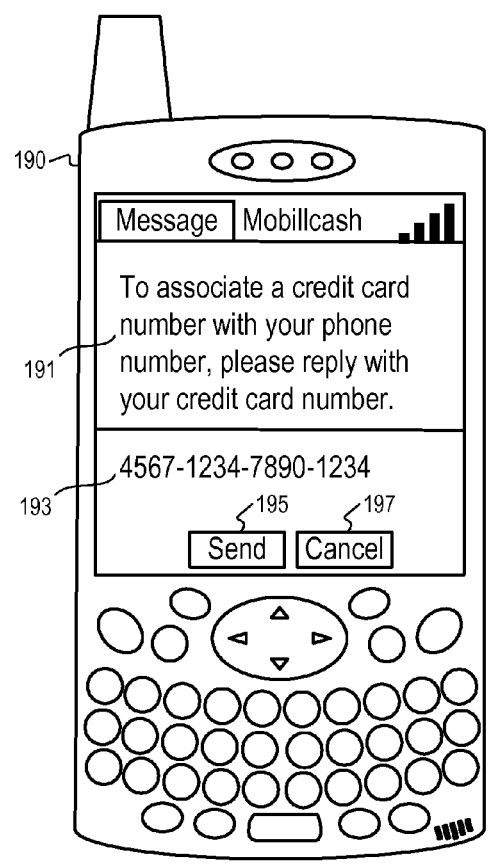
FIG. 6 illustrates another user interface to associate an account with a telephone number according to one embodiment.

FIG. 6 illustrates another user interface to associate an account with a telephone number according to one embodiment. In FIG. 6, the user interface (190) is presented on the mobile phone (117) of the user. The user interface (190) presents a message (191) from the interchange (101) to the mobile phone (117) at the phone number (123). The message (191) prompts the user to submit the account information (121) by providing a reply message (193). The user may select the "send" button (195) to provide the account information (121) for association with the phone number (123) or select the "cancel" button (197) to ignore the prompt.

In one embodiment, the messages (191 and 193) are transmitted to the mobile phone (117) via a short message service (SMS). Alternatively, the messages can be transmitted to the mobile phone (117) via other protocols, such as multimedia message service (MMS), email, instant messaging, WAP, voice mail, voice messages via an interactive voice response (IVR) system, etc.

Figure 7:
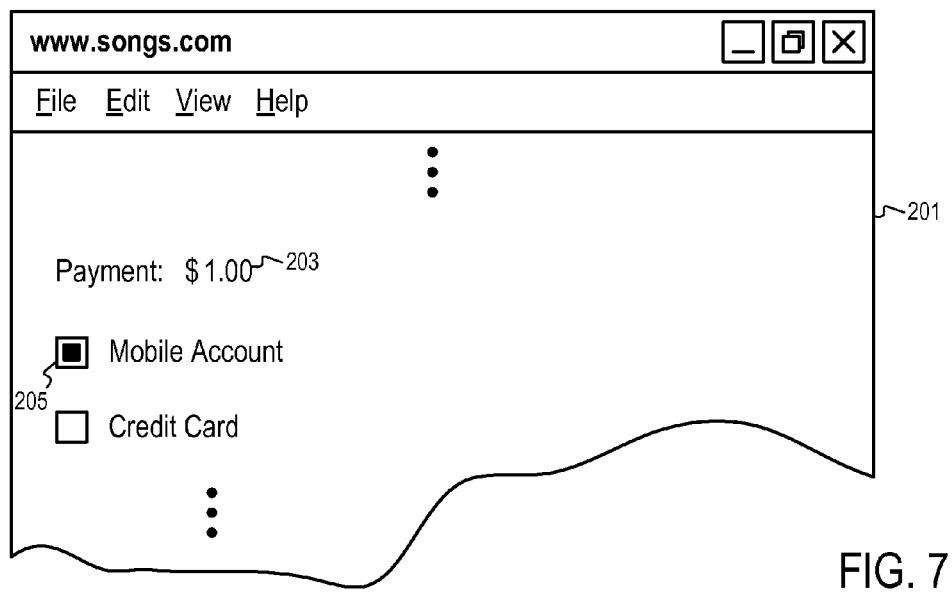
FIG. 7 illustrates a user interface to initiate a payment transaction according to one embodiment.

FIG. 7 illustrates a user interface to initiate a payment transaction according to one embodiment. In FIG. 7, the user interface (201) provides an option (205) to request the interchange (101) to process the payment for the amount (203) required to make a purchase from the server (113) of a merchant.

In one embodiment, after the user selects the payment option (205), the server (113) directs the request to the web server of the interchange (101), with a set of parameters to indicate the amount (203), the identity of the merchant, a reference to the purchase, etc. Thus, the user does not have to provide any personal information to the server (113) of the merchant to complete the payment process.

Alternatively, the user may provide the phone number (123) to the merchant to process the payment. Thus, the user does not have to visit the web site of the interchange (101) to complete the payment.

Figure 8:
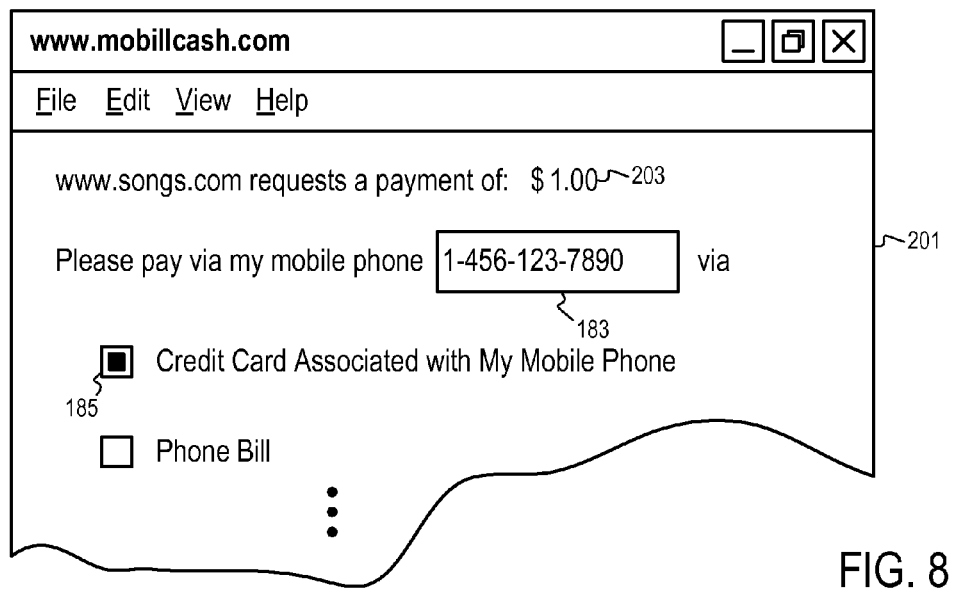
FIG. 8 illustrates a user interface to initiate a payment request according to one embodiment.

FIG. 8 illustrates a user interface to initiate a payment request according to one embodiment, after the payment request is redirected to the web site of the interchange (101). In FIG. 8, the user interface (201) includes the identity of the merchant and the amount (203) of the requested payment. The user interface (201) includes a text field (183) to allow the user to provide the phone number (123) to identify the account information (121) via its association with the phone number (123) in the data storage facility (107).

Further, user authentication may be used to reduce false messages to the phone number (123). For example, the user interface (201) may request a PIN for enhanced security. For example, the user may be required to register with the interchange (101) prior to using the services of the interchange (101); and after registering with the interchange (101), the user is provided with the PIN or can created a customized PIN to access the functionality provided by the user interface (201).

Alternatively, the user interface (201) may request an identifier associated with the phone number (123) to initiate the payment transaction. In some embodiments, the user interface (201) requires the user to provide no information other than the phone number (123) in the text field (183) to initiate the transaction.

In FIG. 8, the user interface (201) allows the user to select one option from a plurality of payment options, including paying via the phone bill, and paying via one or more of the accounts identified by the account information (121) associated with the phone number (123) in the data storage facility (107).

In some embodiments, the user interface (201) may present the payment options after authenticating the user (e.g., via a personal identification number or password) for enhanced security.

In some embodiments, the user interface (201) identifies the different accounts represented by the account information (121) by showing aliases of the accounts. The aliases may be previously specified by the user, or be dynamically generated by the interchange (101) based on the types of the accounts and/or portions of the account information (121) (e.g., the first or last few digits of the account number)

In one embodiment, once the user submits the payment request via the user interface (201), the interchange (101) transmits a confirmation message to the mobile phone (117) according to the phone number (123) provided in the text field (183). In one embodiment, the interchange (101) transmits the confirmation to the mobile phone (117) after the user is authenticated via the user interface (201) to reduce the possibility of unauthorized/unwelcome messages to the mobile phone (117), which may occur when the user intentionally or unintentionally provides an unrelated phone number in the entry box (183).

Figure 9:
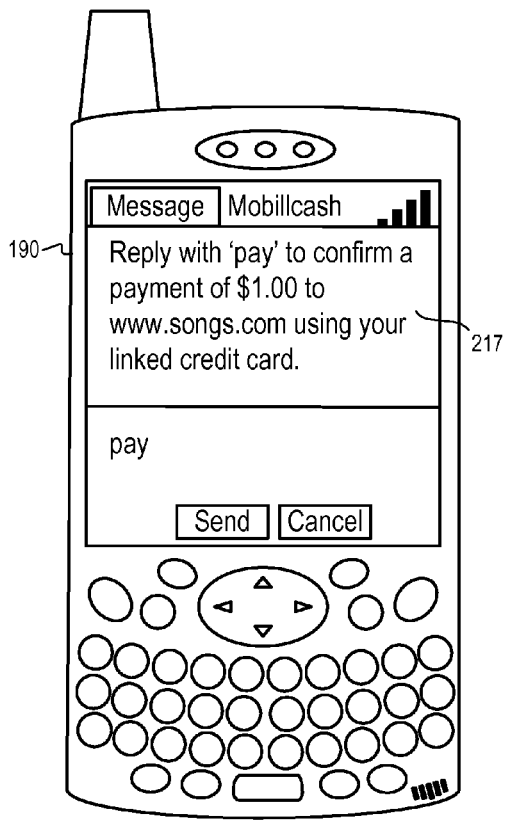
FIG. 9 illustrates a user interface to confirm a payment request according to one embodiment.

FIG. 9 illustrates a user interface to confirm a payment request according to one embodiment. In FIG. 9, the confirmation message (217) includes the amount (203) of the requested payment and the identity of the payee (e.g., a merchant operating the server (113)).

In one embodiment, the confirmation message (217) includes the instruction to reply with a code, such as a code (e.g., "pay") provided in the confirmation message (217) as illustrated in FIG. 9.

The presence of the code in the reply message is an indication of the user approving the request; and the requirement for such a code in the reply eliminates false confirmations (e.g., generated via accidental replies or automated replies).

Alternatively, or in combination, the requested code may include a PIN associated with the account, and/or a code (not shown) randomly generated and presented in the user interface used to initiate the payment transaction (e.g., user interface (201)).

In some embodiments, the code requested in the text message (217) may be a PIN associated with the phone number (123). The text message (217) does not include the code; and the knowledge of the code is an indication of the identity of the user. Thus, the use of such a code increases the security of the transaction.

In a further embodiment, the code requested in the text message (217) includes a code that is provided in response to the payment request (e.g., via the user interface (201), not shown in FIG. 9). The code may be generated randomly at the time the request is received via the user interface (201), or when the user interface (201) is presented to the user. The code provided to the user interface (201) can be requested in the reply received from the user interface (190) to indicate that the user who is in possession of the mobile phone (117) has actual knowledge about the payment request submitted via the user interface (201).

After the correct reply is received, the interchange (101) communicates with the account server (125) to electronically charge the user using the account information (121) and pays the payee using the funds collected via communicating with the account server (125). The interchange (101) then notifies the user when the payment transaction is complete.

Figure 10:
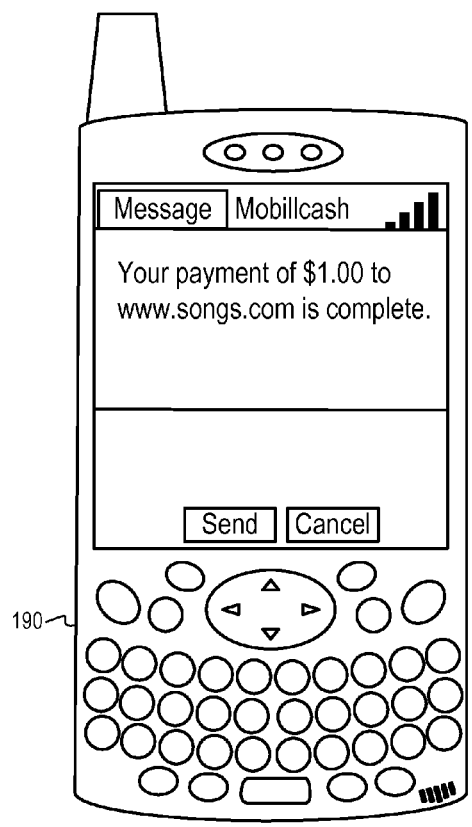
FIG. 10 illustrates a user interface to confirm the completion of a payment transaction according to one embodiment.

For example, the interchange (101) may notify the user via a text message to the mobile phone (117), as illustrated in FIG. 10. FIG. 10 illustrates a user interface to confirm the completion of a payment transaction according to one embodiment. No reply to the message that confirms the completion of the payment transaction is necessary. Once the payment transaction is complete, the user would have access to the product purchased via the payment transaction.

In one embodiment, the interchange (101) stores an address of the user associated with the phone number (123). After the completion of the payment transaction, the interchange (101) provides the address to the server (113) of the merchant for the delivery of the purchased product. In some embodiments, the user may provide multiple addresses associated with the phone number (123) and may select one as a delivery address in the confirmation/approve message to the interchange (101). Alternatively, the interchange (101) may receive an address for product delivery from the mobile phone (117) together with the confirmation/approve message, and then forward the address to the server (113) of the merchant. Thus, the shipping address of the transaction is verified to be associated with the mobile phone (117). In alternative embodiments, the user may directly provide the shipping address in the website hosted on the server (113) of the merchant.

In other embodiments, the user is provided with the option to pay via the mobile phone bill associated with the phone number (123). The interchange (101) may dynamically calculate a set of premium messages, based on a set of limited number of predetermined prices for premium messages, to match the purchase price. The interchange (101) sends the set of premium messages to the mobile phone (117) at the phone number (123) to collect the funds via the telecommunication carriers to pay for the purchases. Thus, the purchase prices are not limited to the set of predetermined prices for premium messages. In some embodiments, the interchange (101) may send the set of premium messages within a period of time (e.g., a week, a month, a number of months, etc.) to spread the payments over the period of time (e.g., to overcome budget limits and/or limits imposed by regulations).

Figure 11:
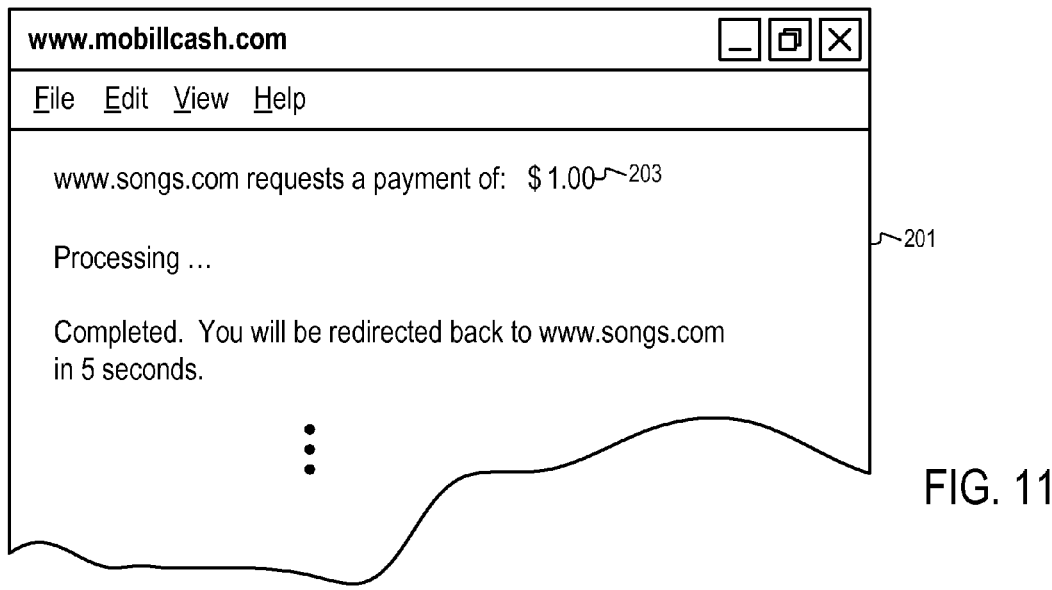
FIG. 11 illustrates a way to redirect a payment confirmation according to one embodiment.

FIG. 11 illustrates a way to redirect a payment confirmation according to one embodiment. For example, after the user submits the payment request to the interchange (101) via the user interface (201) shown in FIG. 8, the interchange (101) may present the user interface (201) illustrated in FIG. 11 to the user. The user interface (201) indicates that the request is being processed; and the user interface (201) is periodically updated to show progress. Once the payment transaction is completed, the user interface (201) provides a confirmation message and may automatically redirect the user back to the website of the payee (e.g., to access the purchased products or services).

In one embodiment, the user is required to provide the approval in response to the confirmation message (217), as illustrated in FIG. 9, within a predetermined period of time. If the user fails to provide the approval from the mobile phone (117) within the predetermined period of time, the payment request may be rejected; and the user interface (201) may present a message indicating the failure and then redirect the user back to the website of the payee.

In some embodiments, instead of redirecting the user back to the website of the payee after the expiration of a predetermined period of time (e.g., after the failure of the payment process, or after the completion of the payment), the user interface (201) may provide a link to the website of the payee to allow the user to manually select the link to go back to the website of the payee to continue the process at the website of the payee.

Figure 12:
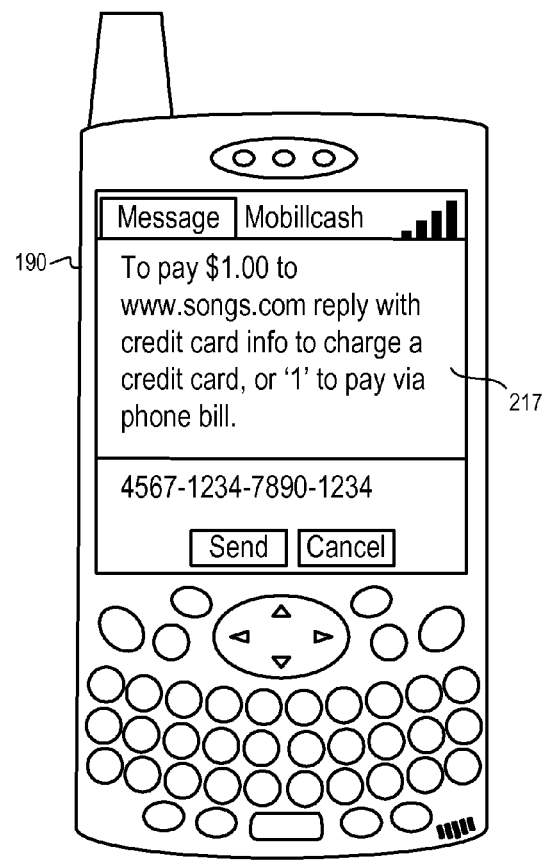
FIG. 12 illustrates a user interface to receive payment options according to one embodiment.

FIG. 12 illustrates a user interface to receive payment options according to one embodiment. In FIG. 12, the interchange (101) sends a message (217) to the mobile phone (117) to provide a number of options to the user. The message (217) identifies the amount (203) of the requested payment and the identity of the payee (e.g., a merchant operating the server (113)) and asks the user to approve the payment request via a reply that contains a selected payment option.

In FIG. 12, the user may reply with the code "1" to approve the payment request and to pay via the phone bill of the mobile phone (117). Alternatively, the user may reply with credit card information to charge the payment to a credit card, as illustrated in FIG. 12.

In one embodiment, if the user provides credit card account information in the approval message, the credit card account information is stored and associated with the phone number (123) in the data storage facility (107). Thus, in subsequent approval messages, the user does not have to supply the same information again.

For example, the data storage facility (107) may store account information for each of a plurality of account types (e.g., Visa, MasterCard, checking, savings, etc.) Thus, each of the accounts can be identified to the user via the account type in the confirmation message, without revealing the details of the account information.

For example, the interchange (101) may combine the name of the financial institutions and the type of accounts to generate aliases for the account information.

In some embodiment, the user may define the aliases for the account information by supplying the aliases with the account information (121) for association with the phone number (123).

Figure 13:
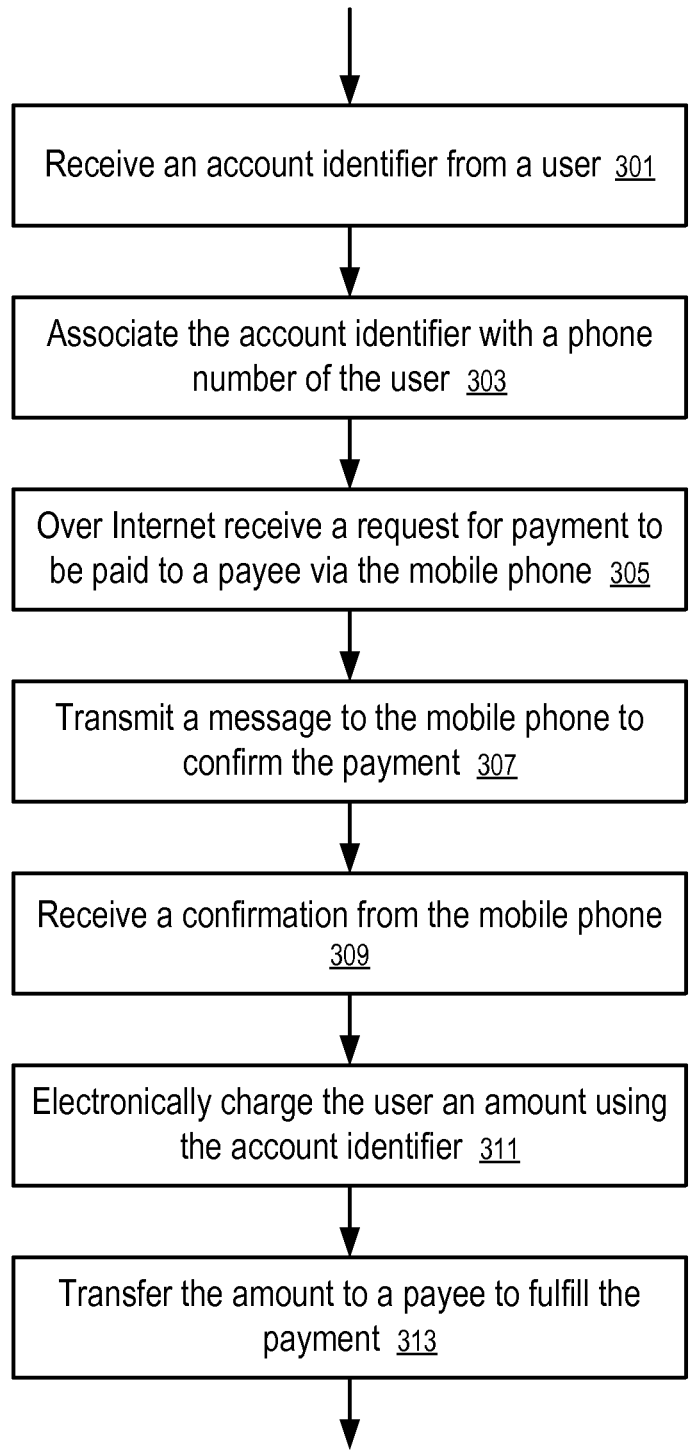
FIG. 13 shows a method to process an online payment according to one embodiment.

FIG. 13 shows a method to process an online payment according to one embodiment. In FIG. 13, the interchange (101) receives (301) an account identifier (e.g., 121) from a user and associates (303) the account identifier with a phone number (123) of the user in the data storage facility (107). Over the Internet the interchange (101) subsequently receives (305) a request for payment to be paid to a payee via the mobile phone (117) identified by the phone number (123). In response to the request, the interchange (101) transmits (307) a message (217) to the mobile phone (117) to confirm the payment.

After receiving (309) a confirmation or approval from the mobile phone (117) for the payment, the interchange (101) electronically charges (311) the user an amount using the account identifier (e.g., via communicating with the account server (125) using the account identifier). The interchange (101) then transfers (313) the amount to a payee to fulfill the payment.

Figure 14:
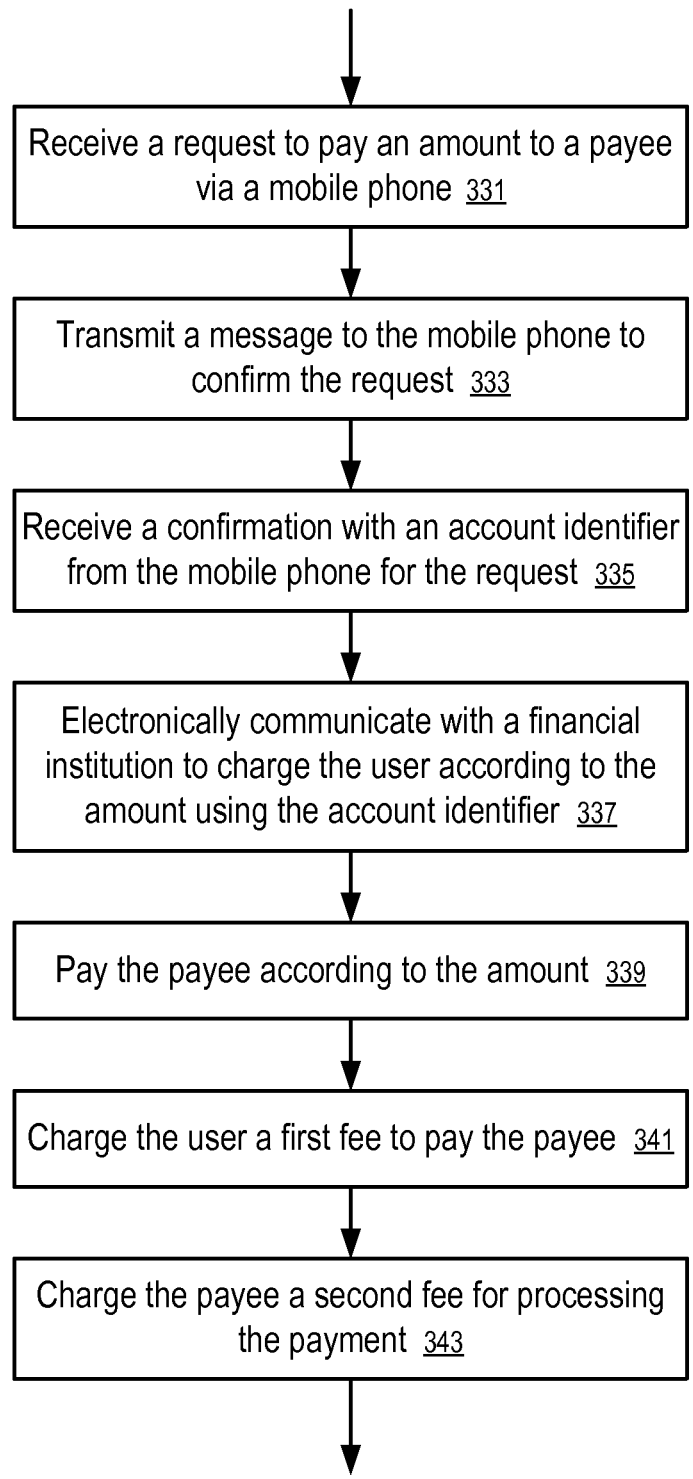
FIG. 14 shows another method to facilitate a payment transaction according to one embodiment.

FIG. 14 shows another method to facilitate a payment transaction according to one embodiment. In FIG. 14, the interchange (101) receives (331) a request to pay an amount to a payee via a mobile phone (117). The interchange (101) transmits (333) a message (217) to the mobile phone (117) to confirm the request via the converter (131) corresponding to the controller (115) of the mobile phone (117).

After the interchange (101) receives (335) a confirmation with an account identifier (e.g., 121) from the mobile phone (117) for the request, the interchange (101) electronically communicates (337) with a financial institution to charge the user the specified amount using the account identifier. The interchange (101) pays (339) the payee according to the amount, optionally charges (341) the user a first fee to pay the payee, and optionally charges (343) the payee a second fee for processing the payment.

In one embodiment, the users are given an incentive to provide the account information (121) for electronic payments via the account servers (125). For example, the interchange (101) may charge a lower fee for fulfilling payment requests via the account server (125) than for fulfilling payments requests via the phone bill. For example, the interchange (101) may offer rebates, discounts, etc. to the users who provide the account information (121). In some embodiments, the interchange (101) can complete a payment process via the account server (125) with fewer restrictions than via the phone bill.

In one embodiment, the merchant may specify the second fee. Different merchants may offer different percentages of the purchase prices as the second fee; and the interchange (101) may calculate the first fee based on the second fee offered by the merchant, by deducting the second fee from the total fees to be charged (e.g., fees charged by the telecommunication carrier for collecting the funds via the mobile phone bill associated with the phone number (123) and/or the fees charged by the interchange (101) for processing the payments). Since the first fee is charged to the customer (e.g., the purchaser of products and services), the cost to the customer can vary based on the selection of the merchant. For the same purchase prices, the first fee (and thus the cost to the customer) may be different for purchases made via different merchants, because the merchants may offer different percentages of the purchase price as the second fee. In some embodiments, the first and second fees include both fees charged by the telecommunication carrier for collecting the funds via the mobile phone bill/account associated with the phone number (123) and the fees charged by the interchange (101) for processing the payments. In some embodiments, the first fee includes the fees charged by the telecommunication carrier but not the fees charged by the interchange (101). In some embodiments, the second fee includes the fees charged by the telecommunication carrier but not the fees charged by the interchange (101). In some embodiments, the first fee and/or the second fee do not include the fees charged by the telecommunication carrier. In some embodiments, the first fee is not charged; and in other embodiments, the second fee is not charged.

FIGS. 15-18 show methods to approve a payment transaction according to some embodiments.

Figure 15:
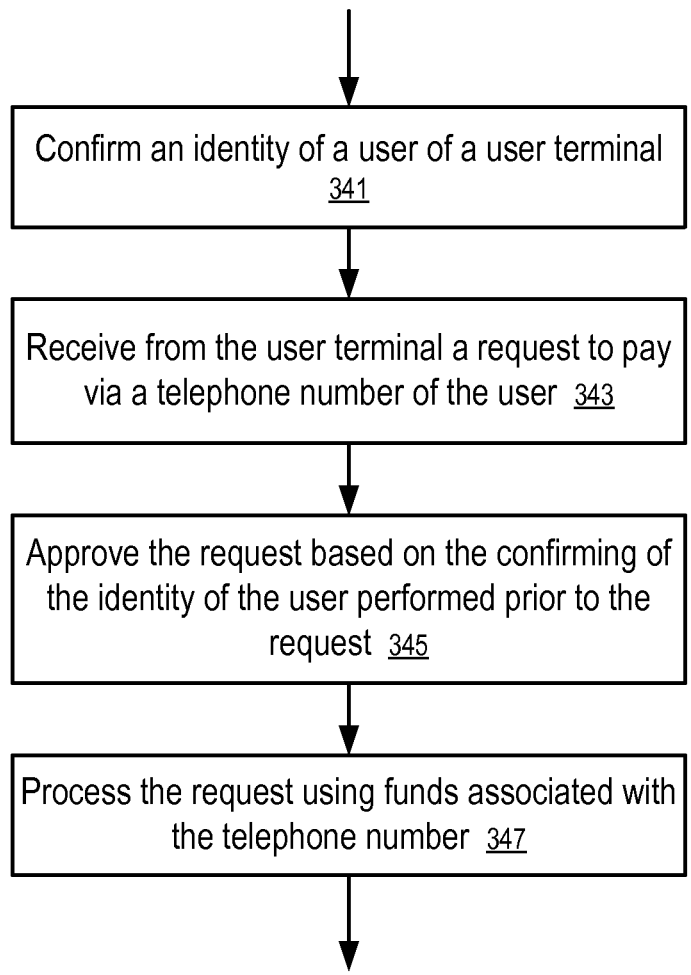
FIGS. 15-18 show methods to approve a payment transaction according to some embodiments.

In FIG. 15, after the interchange (101) confirms (341) an identity of a user of a user terminal (111), the interchange (101) receives (343) from the user terminal (111) a request to pay via a phone number (123) of the user. In one embodiment, the interchange (101) confirms the identify of the user of the user terminal (111) and/or associates the identity of the user of the user terminal (111) with the phone number (123) of the mobile phone (117) prior to the user submitting a request to pay via the phone number (123). Thus, communications with the mobile phone (117) at the phone number (123) for the confirmation and/or approval of the request does not have to take place between the request and the payment operation; and thus the delay between the request and the payment operation can be reduced.

For example, the user terminal (111) may include a web browser; and the user may log into a web server of the interchange (101) using the web browser. The interchange (101) may prompt the user via the web browser running on the user terminal (111) to provide the phone number (123)

and a password associated with the phone number (123). After verifying the password, the user is logged into a session tracked by the web browser on the user terminal (111); and the web browser running on the user terminal (111) is associated with the phone number (123).

In one embodiment, the interchange (101) further communicates with the mobile phone (117) at the phone number (123) to complete the verification process. For example, the interchange (101) may send a one-time verification code to the mobile phone (117) at the phone number (123) and request the user to provide the correct one-time verification code back via the user terminal (111) to verify the association between the user terminal (111) and the phone number (123). Alternatively, the interchange (101) may provide the one-time verification code to the user terminal (111) and instruct the user to communicate the code back to the interchange (101) via the mobile phone (117) at the phone number (123). Alternatively, after the user logs in using the user terminal (111), the interchange (101) may send a message to the mobile phone (117) to request a reply from the mobile phone (117) at the phone number (123) within a predetermined period of time to validate the session. In some embodiments, after the user provides the phone number (123) to the interchange (101) using the user terminal (111), the user is instructed to provide the password via the mobile phone (117) to complete the log in process.

In one embodiment, the user terminal (111) tracks the session. For example, the user terminal (111) may use a web browser to track the session via information maintained by the web browser (e.g., cookies). Alternatively, or in combination, the interchange (101) may track the session by maintaining information on the data storage facility (107). For example, after the user completes the log in process, the interchange (101) may identify the user terminal (111) via identifiers such as Internet address, Media Access Control address (MAC address), a different phone number (e.g., when the user terminal is a different mobile phone), or other software or hardware identification number associated with the user terminal (111), such as a digital certificate; and the interchange (101) may associate the phone number (123) with such identifiers until the expiration of a predetermined time period, or after the user signals an end of the session using the user terminal (111) or using the mobile phone (117) at the phone number (123). In one embodiment, the interchange (101) associates a plurality of identifiers of the user terminal (111) with the phone number (123) for the session. When at least one of the identifiers of the user terminal (111) is changed, the interchange (101) may terminate the session automatically.

In FIG. 15, after the user terminal (111) submits the request to pay via the phone number (123), the interchange (101) approves (345) the request based on the confirming of the identity of the user performed prior to the request and processes (347) the request using funds associated with the phone number (123). For example, the interchange (101) may transmit premium messages, via a corresponding converter (131), to a mobile phone (117) at the phone number (123) to collect the funds, or receive premium messages from a mobile phone (117) at the phone number (123) to collect the funds. For example, the interchange (101) may determine the account information (121) (e.g., an account identifier, such as a credit card number, a bank account number, a debit card number, etc.) stored and associated with the phone number (123) on the data storage facility (107) of the interchange (101) to charge the user using the account information (121).

In one embodiment, in response to the payment request from the user terminal (111), the interchange (101) may send a notification message to the mobile phone (117) at the phone number (123). The user is not required to provide a reply to complete the payment process. However, the user of the mobile phone (117) is provided with the option/opportunity to reply and report a fraudulent use, or to cancel the request (e.g., within a predetermined period of time).

Figure 16:
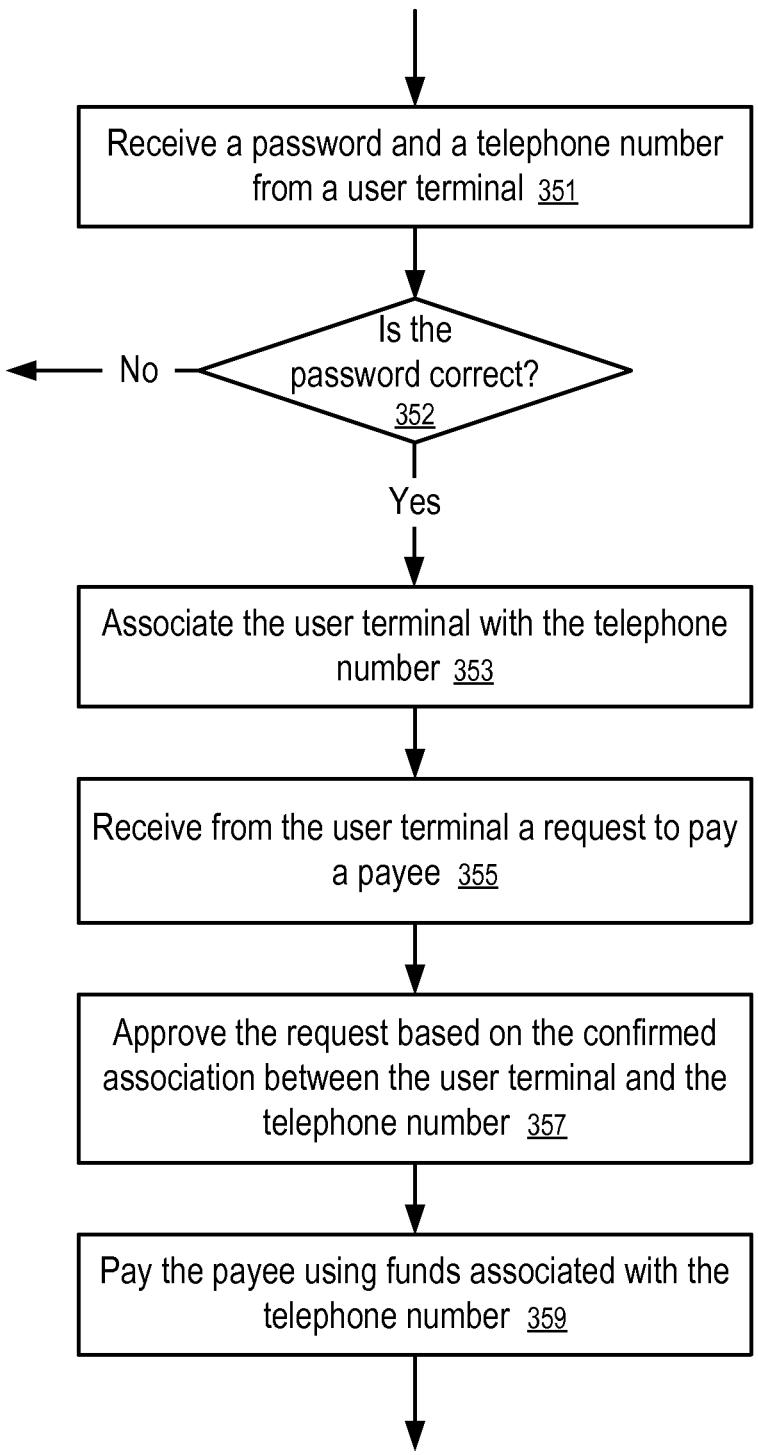

In one embodiment, the data storage facility (107) stores a password associated with the phone number (123) for authentication. In FIG. 16, after the interchange (101) receives (351) a password and a phone number (123) from a user terminal (111), the interchange (101) determines (352) whether the received password is the correct password for the phone number (123). If the received password is the correct password for the phone number (123), the interchange (101) associates (353) the user terminal (111) with the phone number (123) in the data storage facility (107). If, during the time period in which the user terminal (111) is associated with the phone number (123), the interchange (101) receives (355) from the user terminal (111) a request to pay a payee (e.g., via the user interface (201) illustrated in FIG. 8), the interchange (101) may approve (357) the request based on the confirmed association between the user terminal (111) and the phone number (123) and pay the payee using funds associated with the phone number (123), without requiring a confirmation via the mobile phone (117) at the phone number (123). In some embodiments, after the user terminal (111) submits the phone number (123) to the interchange (101), the interchange (101) may request the password from the mobile phone (117) at the phone number (123).

In one embodiment, during the time period in which the user terminal (111) is associated with the phone number (123), the interchange (101) may automatically provide the phone number (123) in the text field (183) in the user interface (201) for submitting a payment request, as illustrated in the FIG. 8, based on the association between the user terminal (111) and the phone number (123). The phone number (123) can be provided by the interchange (101) in the text field (183) as a default input. Alternatively, the interchange (101) may not provide the phone number (123) and may require the user to enter the phone number (123) in the text field (183) for enhanced security. In some embodiments, the interchange (101) may dynamically determine whether or not to present the phone number (123) in the text field (183) based on a transaction pattern associated with the phone number (123). For example, if the current request matches the pattern, the interchange (101) presents the phone number (123) as the default input to simplify user interactions; otherwise, the interchange (101) does not provide the phone number (123) in the text field (183) for enhanced security.

Figure 17:
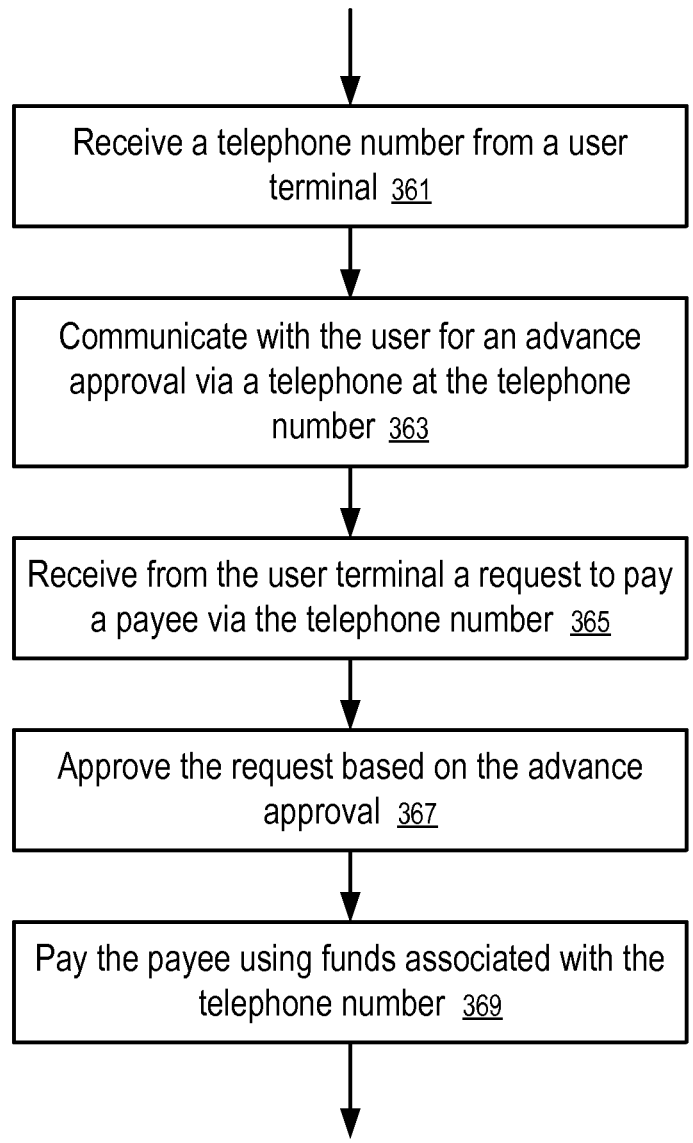

In FIG. 17, after the interchange (101) receives (361) a phone number (123) from a user terminal (111), the interchange (101) communicates (363) with the user for an advance approval for the user terminal (111) via a mobile phone (117) at the phone number (123). For example, the interchange (101) may communicate with the mobile phone (117) at the phone number (123) for the advance approval and/or communicate with the user terminal (111) to confirm a password associated with the phone number (123).

In one embodiment, the advance approval is specific for the user terminal (111); and the interchange (101) stores identifiers of the user terminal (111) with the advance approval. For example, the interchange (101) may communicate with the user terminal (111) and/or the mobile phone (117) to associate the user terminal (111) with the phone number (123) for the advance approval of one or more subsequent payment requests.

In some embodiments, the advance approval is not limited to a particular user terminal (111). For example, the user may directly use the mobile phone (117) at the phone number (123) to communicate the advance approval to the interchange (101) without having to identify the user terminal (111). Alternatively, the user may use a particular user terminal (111) to initiate the communications with the interchange (101) for the advance approval without limiting the advance approval to subsequent payment requests from the same particular user terminal (111).

In one embodiment, the advance approval is associated with the phone number (123) on the data storage facility (107). When a request to pay via the funds associated with the phone number (123) is received, the advance approval associated with the phone number (123) is identified and applied by the interchange (101). The user does not have to explicitly identify the advance approval in making the payment request.

In one embodiment, the interchange (101) may assign an identification code for the advance approval for enhanced security. The user may use the identification code in the payment request to explicitly identify the advance approval.

In one embodiment, the advance approval specifies a time limit for the expiration of the approval, a budget amount for one or more payment requests, a limit on the types of permitted products and/or services, a time window for permissible payment requests, a frequency for permissible payment requests, and one or more limits based on certain characteristics of the payees (e.g., web addresses, countries, categories).

In one embodiment, the advance approval may specify some limits on the permissible user terminals (111). For example, the advance approval may limit the advance approval to user terminals located with certain geographic areas. The interchange (101) may determine the geographic areas of the user terminals (111) based on the IP addresses of the user terminals (111), the access points for wireless local area communications, the base stations for cellular communications, etc.

After the advanced approval is associated with the phone number (123), the interchange (101) may receive (365) from the user terminal (111) a request to pay a payee via the phone number (123). Based on the advance approval the interchange (101) may approve (367) the request and pay (369) the payee using funds associated with the phone number (123), without requiring a confirmation message from the user via communications with the mobile phone (117) at the phone number (123).

In some embodiments, the interchange (101) may use the transaction history (127) to determine whether or not to require a confirmation message from the user via communications with the mobile phone (117) at the phone number (123). The transaction history (127) may include a number of records of prior confirmed/approved payment requests.

For example, based on the records of prior payment requests the interchange (101) may determine a payment pattern for the phone number (123), such as a list of frequently used user terminals (111) for the phone number (123), a range for typical payment amounts, a time of day within which typical payment requests are received for the phone number (123), a list of frequently used payees paid via the phone number (123), a list of categories of services and/or products frequently paid for via the phone number (123), a recent payment request confirmed within a predetermined period of time, etc.

Figure 18:
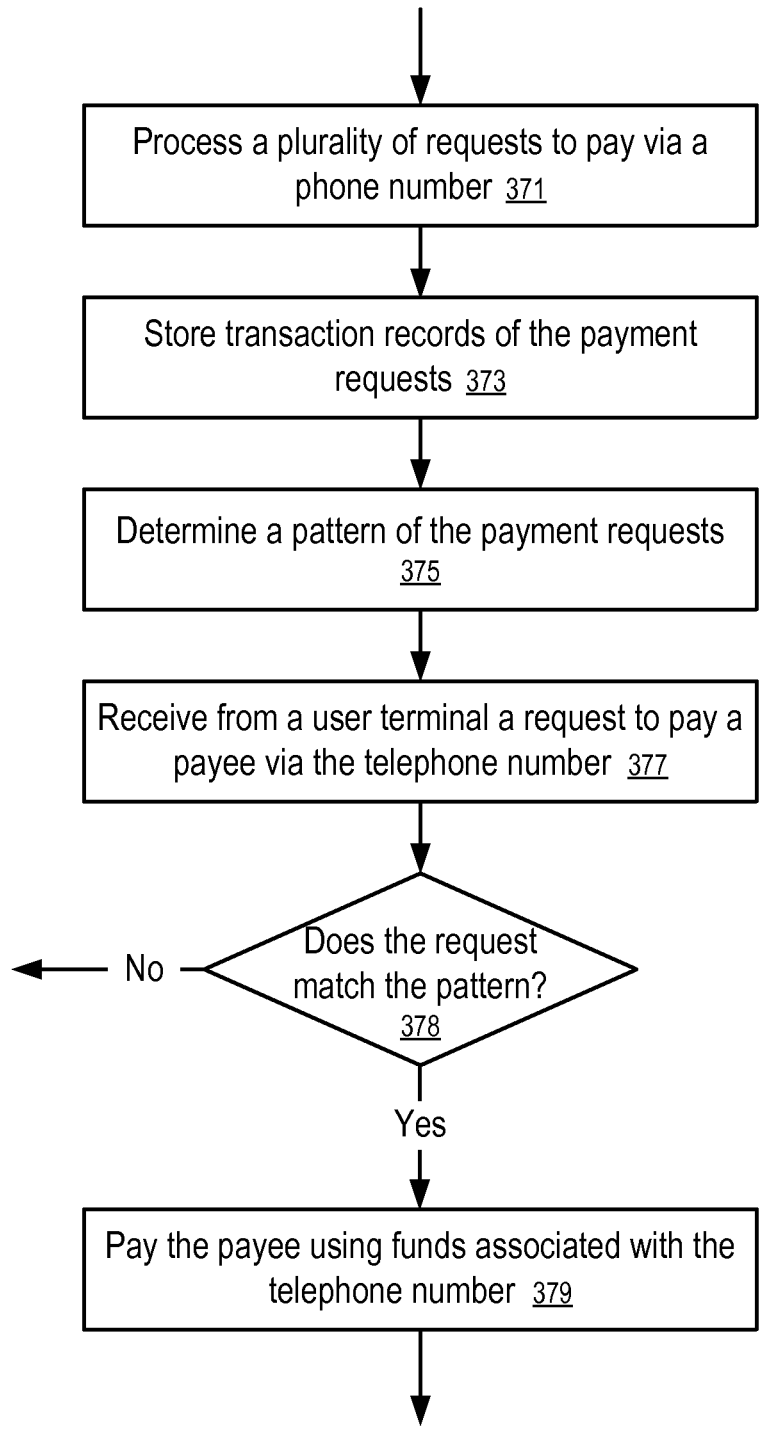

In FIG. 18, the interchange (101) processes (371) a plurality of requests to pay via a phone number (123). The interchange (101) processes (371) the requests via communicating with the mobile phone (117) at the phone number (123). For example, the interchange (101) may send a message to the mobile phone (117) at the phone number (123) and request a reply to the message from the mobile phone (117). For example, the interchange (101) may request a PIN from the mobile phone (117) at the phone number (123) to confirm the requests. For example, the interchange (101) may send one-time codes representing the requests to the mobile phone (117) or receive one-time codes representing the requests from the mobile phone (117).

The interchange (101) stores (373) transaction records of the payment requests and determines (375) a pattern of the payment requests.

Subsequently, when the interchange (101) receives (377) from a user terminal (111) a request to pay a payee via the phone number (123), the interchange (101) determines (378) whether the request matches the pattern. If the request matches the pattern, the interchange (101) pays (379) the payee using funds associated with the phone number (123), without requiring a confirmation communicated via the mobile phone (117) at the phone number (123) to speed up the payment process. The interchange (101) may send a notification to the mobile phone (117) at the phone number (123), without requiring a reply prior to making the payment.

In one embodiment, after the interchange (101) transmits a premium message to the mobile phone (117) for a transaction between the user of the mobile phone (117) and the merchant of the server (113), the telecommunication carrier of the mobile phone (117) sends a bill to the user of the mobile phone (117) for the premium message (e.g., on a monthly statement date) and requests the user to pay the bill within a number of days (e.g., on a due date specified on the monthly statement). The user may pay the bill before or on the due date, or dispute the charge, or fail to pay the bill for various reasons. If the user pays the bill, including the charge for the premium message, the telecommunication carrier may keep a portion of the total amount charged via the premium message and provide the remaining portion to the interchange (101). After the telecommunication carrier provides to the interchange (101) the funds collected via the premium message, the interchange (101) pays the merchant of the server (113) to close the transaction at the server (113).

For example, the telecommunication carrier may bill the user of the mobile phone (117) monthly and settle with the interchange (101) monthly. The interchange (101) may settle with the merchant of the server (113) monthly, after settling with the telecommunication carrier. Thus, it may take several months before funds charged via the premium message reaches the merchant.

In one embodiment, to accelerate the transaction process, the interchange (101) notifies the server (117) of the merchant when the premium message is sent to the mobile phone (117), allowing the server (117) to release the purchased item to the user. Thus, the user does not have to wait until the funds reach the merchant to access the purchased item. Further, the interchange (101) may offer to provide an amount to the merchant, before the funds collected via the premium message become available.

For example, the interchange (101) may provide advance payments to the merchant (e.g., on a monthly basis) based on the collection of transaction information and risk analysis. The interchange (101) can prepare an estimate of an amount the merchant is likely to earn, based on the data collected in a transaction database. The interchange (101) then notifies the merchant of the estimated amount and offers to deliver the estimated amount to the merchant prior to receiving funds from the telecommunication carrier. Upon receipt of payments from the telecommunication carrier, the interchange (101) compares the actual receipts with the amount prepaid to the merchant to generate a balance to properly settle with the merchant, taking into account any refunds, charge backs, fee changes and other variables.

In one embodiment, the interchange (101) charges the merchant a variable fee for the advance payment, based on the volume and duration of time of the advance payment and other considerations, such as repayment risk, credit worthiness, etc. In one embodiment, the interchange (101) may present the transaction information and risk analysis results to a third party lender to allow the merchant to borrow against the income expected from the premium messages sent by the interchange (101).

Figures 19, 20:
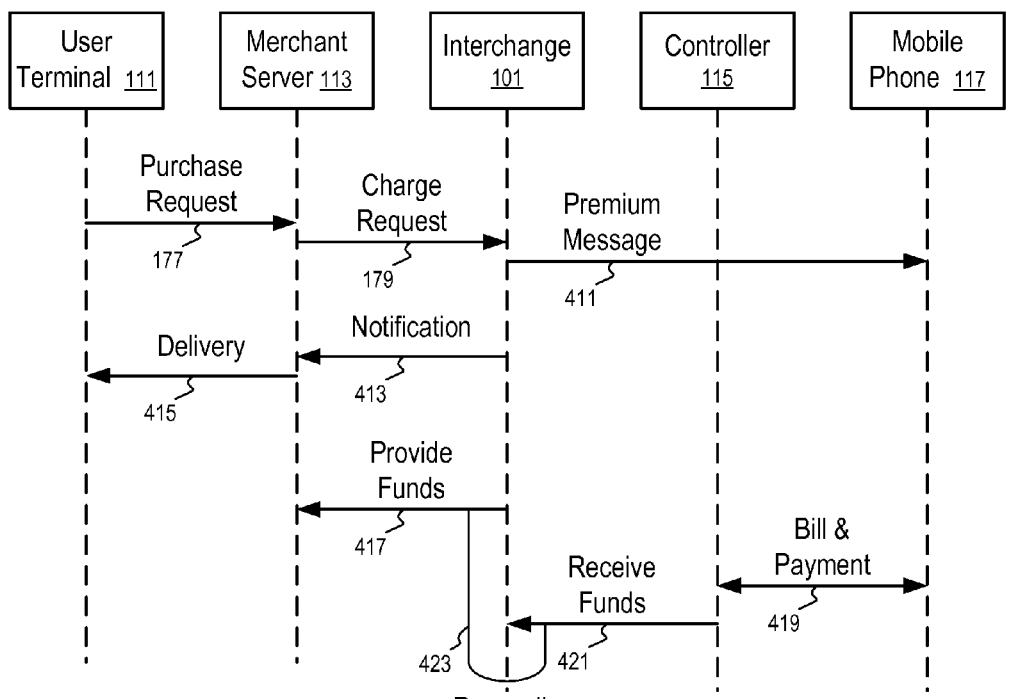
FIG. 19 illustrates a transaction database according to one embodiment.
FIG. 20 shows an arrangement to accelerate payments to a merchant according to one embodiment.

FIG. 19 illustrates a transaction database according to one embodiment. The transaction database (401) may be maintained by the interchange (101) in the data storage facility (107). In FIG. 19, the transaction database (401) includes a number of records (e.g., 410) for transactions between users of mobile phones (e.g., 117) and servers (e.g., 113) of merchants.

In one embodiment, a transaction record (410) includes a number of fields, such as transaction ID (402) to identify a transaction, merchant ID (403) to identify the merchant, phone number (123) to identify the user to whom the premium message is sent, IP address (405) of the user terminal (111) used to initiate the transaction, type (406) of the item purchased, sales amount (407), refund (409) which (if any) occurred after settling the payments for the transaction, etc.

In one embodiment, the transaction record includes not only fields for the identification of the transaction but also fields for the identification of various characteristics of the transaction, which can be used to estimate the risk in the settlement of the transaction and/or the risk in similar transactions. More or less fields can be used in different embodiments. For example, the transaction record may include a field to record the length of the time period (e.g., numbers of days) between when a transaction occurs and when funds collected via the premium messages are received for the transaction from the telecommunication carrier of the mobile phone (117). For example, the transaction record may include a field to record whether or not the user of the mobile phone (117) disputes the transaction, or requests a refund for the transaction.

Based on past transactions that have been settled, the interchange (101) can estimate the risk in the transactions that have payments pending to be settled. For example, based on the settled transactions, the interchange (101) can compute the ratio between the amount actually collected via premium messages sent on behalf of the server (113) of a merchant and the amount initially charged via the premium messages sent on behalf of the server (113) of a merchant. For example, based on the settled transactions, the interchange (101) can compute the rate at which the user at the phone number (123) pays for the premium messages received from the interchange (101). For example, based on transaction statistics, the interchange (101) can compute the rate at which users request refunds for purchasing items having the type (406). For example, based on the settled transactions, the interchange (101) can compute the likelihood of fraudulent purchases made at the IP address (405).

The risks may be a function of various parameters of the transaction, the user and/or the merchant. For example, the age of the user can be a factor, since the purchases made by children may be disputed by their parents. For example, the servers configured to provide products or services for children may have a high rate of refund requests or charge backs.

Based on the risk analysis performed using information about the settled transactions, the interchange (101) can compute an amount the merchant is expected to receive for a set of transactions in which the interchange (101) has sent premium messages to mobile phones on behalf of the merchant and the interchange (101) has not yet received from the corresponding telecommunication carriers any indication about whether the users have paid for the premium messages.

In one embodiment, the interchange (101) computes the amount on a transaction by transaction basis. For example, for each of the pending transactions (e.g., not yet settled transactions), the interchange can determine the probability of the successful collection of funds from the premium messages sent in the transaction and compute an expected amount based on the probability and the sales amount (407). The expected amounts of pending transactions for a merchant can be summed to generate the expected amount that can be offered to the merchant for pending transactions (e.g., on a monthly basis).

Alternatively, the interchange (101) can group transactions by characteristics and compute the expected amount based on the risk of the group. For example, the ratio between the actual amount collected in the past for the merchant and the amount initially charged on behalf of the merchant in the past can be applied to the total amount charged on behalf of the merchant in the pending transactions to obtain an estimated amount the merchant can expect.

In some embodiments, the interchange (101) provides the risk data for the pending transactions to a lender to allow the lender to make loan offers to the merchant. When the interchange (101) receives the payments from the telecommunication carries for the premium messages, the interchange (101) can repay the lender using the funds collected on behalf of the merchant.

In one embodiment, the interchange (101) may identify the transactions that have a probability of being a fraudulent transaction higher than a threshold and exclude the transactions from advance payment offers. For example, when a user terminal (111) at a single IP address is responsible for initiating purchase requests charged to multiple different mobile phones (117) (e.g., more than two) within a predetermined period of time (e.g., two hours), there is a high likelihood that some or all of the transactions are fraudulent. Thus, the interchange (101) may not offer any advance payment to the merchant for such transactions (or a low percentage of the amount charged, based on the likelihood of the transaction being a fraudulent transaction).

FIG. 20 shows an arrangement to accelerate payments to a merchant according to one embodiment. In FIG. 20, the user terminal (111) submits a purchase request (177) to the server (113) of a merchant. The purchase request (177) includes a phone number (123) of the mobile phone (117) of the user. The server (113) of the merchant submits a charge request (179) to the interchange (101) to charge the user using the phone number (123). In some embodiments, the user terminal (111) may send the charge request directly to the interchange (101), with an indication of the merchant server (113) identified as the payee.

In one embodiment, the interchange (101) communicates with the mobile phone (117) and/or the user terminal (111) to confirm the charge request (179). For example, the interchange (101) may transmit a text message to the mobile phone (117) and request a reply from the mobile phone (117) to confirm the charge request (179).

After the charge request (179) is confirmed, the interchange (101) sends one or more premium messages (411) to the mobile phone (117) to cause the telecommunication carrier to collect funds corresponding to the prices of the premium message (411) (e.g., via mobile terminated premium messages). In alternative embodiments, the interchange (101) may receive premium messages (411) from the mobile phone (117) to collect the funds (e.g., via mobile originated premium messages). In other embodiments, the interchange (101) may communicate with the controller (115) of the mobile phone (117) to charge an amount on the phone bill of the mobile phone (117) without the transmission of a premium message to or from the mobile phone (117) (e.g., via operator billing).

In FIG. 20, after the interchange (101) transmits the premium message (411) to the mobile phone (117), the interchange (101) provides a notification (413) to the merchant server (113) to allow the server (113) of the merchant to deliver (415) the item purchased by the user terminal. For example, the item purchased may be a song, a video clip, an article, a number of points usable to play games on the server (113), or an amount of virtual cash that can be used on the server (113) to access premium features. Thus, the user may access the purchased item shortly after the transmission of the premium message, without having to wait until the funds are collected by the controller (115) and passed on to the merchant (e.g., via the interchange (101)).

In FIG. 20, the interchange (101) may provide the funds (417) to the merchant server (113) before the controller (115) obtains the funds charged via the premium message (411). The interchange (101) may estimate the risk in the transaction and provide only a portion of the total balance of the transaction that is due to the merchant. When the risk is low, the interchange (101) may provide the entire amount that is due to the merchant. In some embodiments, the interchange (101) may provide the funds (417) before, or concurrently with, the notification (413) (e.g., via electronic payments). Alternatively, the interchange (101) may provide the funds via monthly settlements with the merchant. In further embodiments, the merchant can access the interchange (101) (e.g., via a web interface) to request a list of pending transactions, view the estimated amount that can be generated from the pending transactions, and request an advance payment. Thus, the closing and settlement of the transaction from the point of view of the merchant can be accelerated.

In FIG. 20, after the controller (115) bills the mobile phone (117) for the premium message (411) and receives the payments (419), the interchange (101) receives funds from the controller (115). The interchange (101) reconciles (423) the funds (417) advanced to the server (113) and the funds (421) actually received from the controller (115) to generate a balance. According to the balance, the interchange (101) may send additional funds to the merchant, or reduce future advance payments to the merchant, or request a refund from the merchant. In one embodiment, the interchange (101) further adjusts the risk assessments to reduce the subsequent balance generated from the mismatch between the advanced funds (417) and the actual collected funds (421).

Figure 21:
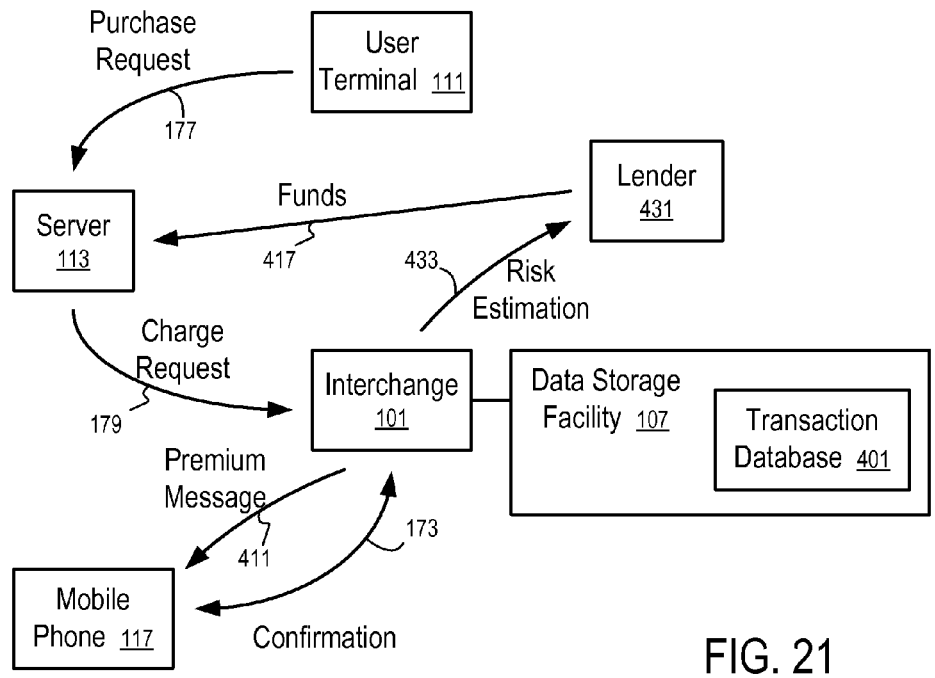
FIG. 21 shows a system to provide funds to a merchant according to one embodiment.

FIG. 21 shows a system to provide funds to a merchant according to one embodiment. In FIG. 21, a third party lender (431) is used to finance the advance payment to the merchant of the server (113), where the advance payment is secured or backed by the premium messages (411) sent to the mobile phone (117) for the purchase request (177) submitted from the user terminal (111).

In FIG. 21, the interchange (101) communicates with the mobile phone (117) for a confirmation (173) of the charge request (179) received from the server (113). The confirmation (173) reduces errors and fraudulent transactions. The interchange (101) uses the transaction database (401) hosted on the data storage facility (107) to estimate the probability of success in collecting the funds as priced by the premium messages from the user of the mobile phone (117).

In one embodiment, the interchange (101) provides the risk estimation (433) to the lender (431) to allow the lender (431) to make a loan to prepay the merchant of the server (113) for the transaction. The interchange (101) collects the funds via the premium message (411) to repay the loan on behalf of the merchant and settles with the merchant and the lender (431) at the end of the term of the loan.

In some embodiments, the merchant of the server (113) can sell the revenue generated by the transaction to the lender (431). After the interchange (101) presents the risk estimation (433) to the lender (431) and the merchant, the lender may purchase from the merchant the rights to the revenue generated by the premium message (411). The lender (431) provides the funds (417) as the payment for the rights to the revenue generated by the premium message (411). Thus, the transaction can be closed and settled at the server (113) upon receiving the funds (417) from the lender (431). When the interchange (101) obtains the funds collected by the telecommunication carrier of the mobile phone (117), the interchange (101) provides to the lender (431) the actual revenue generated by the premium message (411).

In some embodiments, the interchange (101) allows the lender (431) to access the transaction database (401) to estimate risk and determine the price to purchase the rights to the revenue generated by the premium message (411) sent to the mobile phone (117).

In some embodiments, the interchange (101) purchases the rights from the merchant server (113) or makes the loan to the merchant, based on an analysis of the transaction database (401). For example, in response to the charge request, the interchange (101) may offer to buy the rights to the payment to accelerate the closing of the transaction at the server (113).

Figure 22:
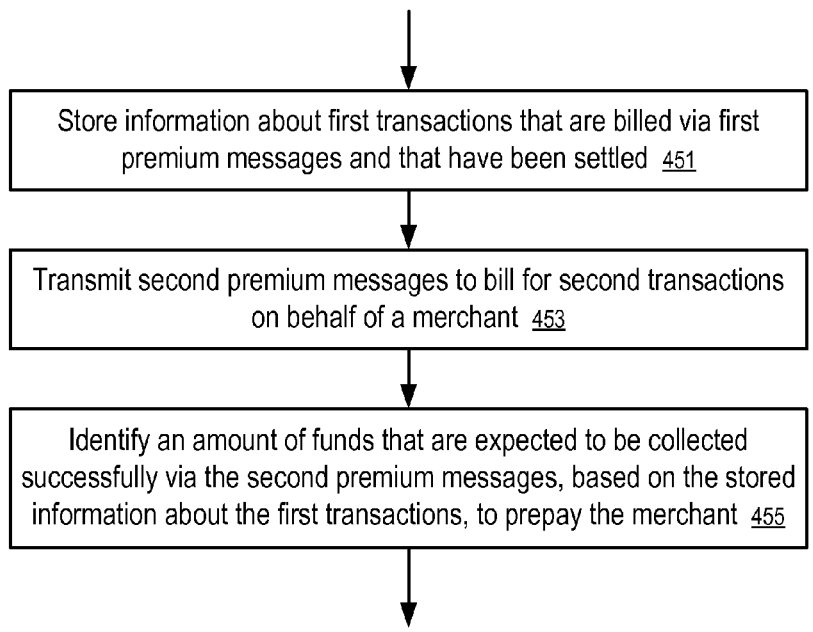
FIG. 22 shows a method to provide funds to a merchant according to one embodiment.

FIG. 22 shows a method to provide funds to a merchant according to one embodiment. In FIG. 22, an interchange (101) is configured to store (451), in a transaction database (401) hosted on a data storage facility (107), information about first transactions that are billed via first premium messages and that have been settled. The interchange (101) is configured to transmit (453) second premium messages to bill for second transactions on behalf of a merchant. To prepay the merchant, the interchange (101) is configured to identify (455) an amount of funds that are expected to be collected successfully via the second premium messages, based on the stored information about the first transactions. The identified amount is typically a portion of the total amount billed via the second premium messages.

In one embodiment, the interchange (101) prepays the merchant the identified amount of funds for the second transactions, before the funds collected via the second premium messages are received from the telecommunication carrier(s) of the mobile phones (e.g., 117) that receive the second premium messages. After the funds collected via the second premium messages become available, the interchange (101) compares the amount of the actual collected funds and the prepaid amount to further settle with the merchant.

In one embodiment, the interchange (101) prepays the merchant the identified amount of funds as a loan that is backed up by the second transactions. The interchange (101) may charge the merchant fees and/or interest for the loan, based on the size of the loan and/or the duration of the loan. After the funds collected via the second premium messages become available, the interchange (101) applies the funds toward the repayment of the loan. At the end of the predetermined term of the loan, the interchange (101) further settles with the merchant to clear the loan and/or the transaction balance.

In one embodiment, the interchange (101) prepays the merchant the identified amount of funds to purchase the rights to the revenues generated from the second premium messages. Thus, the identified amount of funds paid to the merchant settles the transactions at the server (113) of the merchant; and the interchange (101) can keep the actual funds subsequently collected via the second premium messages (e.g., 411).

In some embodiments, a third party lender (431) prepays the merchant the amount identified by the interchange (101), as a loan or as a purchase of the rights to the revenue generated from the second premium messages (e.g., 411).

In one embodiment, the prepaid amount is identified by the interchange (101) via determining a ratio between an amount collected via the first premium messages and an amount charged via the first premium messages. The first premium messages may be transmitted to collect payments on behalf of the same merchant, or one or more merchants selling items in a same category as the merchant.

In one embodiment, the interchange (101) is configured to identifying third premium messages that have been transmitted to different phone numbers based on purchase requests received from a single Internet Protocol (IP) address within a predetermined period of time. When at least one of the third premium messages is transmitted as part of the second premium messages on behalf of the merchant, the funds charged via the at least one of the third premium messages are excluded from the amount identified by the interchange (101).

In one embodiment, the amount identified by the interchange (101) is based at least in part on the payment histories of users who receive the second premium messages.

In one embodiment, the amount identified by the interchange (101) is based at least in part on the ages of the users who receive the second premium messages. For example, when the users are below a predetermined age limit, the users may not be authorized to make purchases (e.g., by their parents or guardians); and the transactions may be disputed. Thus, transactions by such users may have a lower rate of getting paid than transactions by other users.

In one embodiment, the interchange (101) is configured to identify, from the second premium messages, third premium messages that have a risk of not being paid for higher than a predetermined threshold and exclude the funds charged via the third premium messages from the amount identified for prepayment.

In one embodiment, to identify the amount for prepayment the interchange (101) estimates a risk of a third premium message of the second premium messages not being paid for, based on statistical data and one or more characteristics of a transaction associated with the third premium message, such as an Internet Protocol (IP) address used to initiate the transaction, a type of an item purchased in the transaction, a telecommunication carrier of a phone number to which the third premium message is transmitted, and/or the age of a user receiving the third premium message.

In one embodiment, to identify the amount to prepay the merchant, the interchange (101) determines success rates in collecting funds via premium messages as functions of a number of transaction characteristics, such as the characteristics of the users who made the purchase, the characteristics of the items purchased, the characteristics of the merchant, etc.

Figure 23:
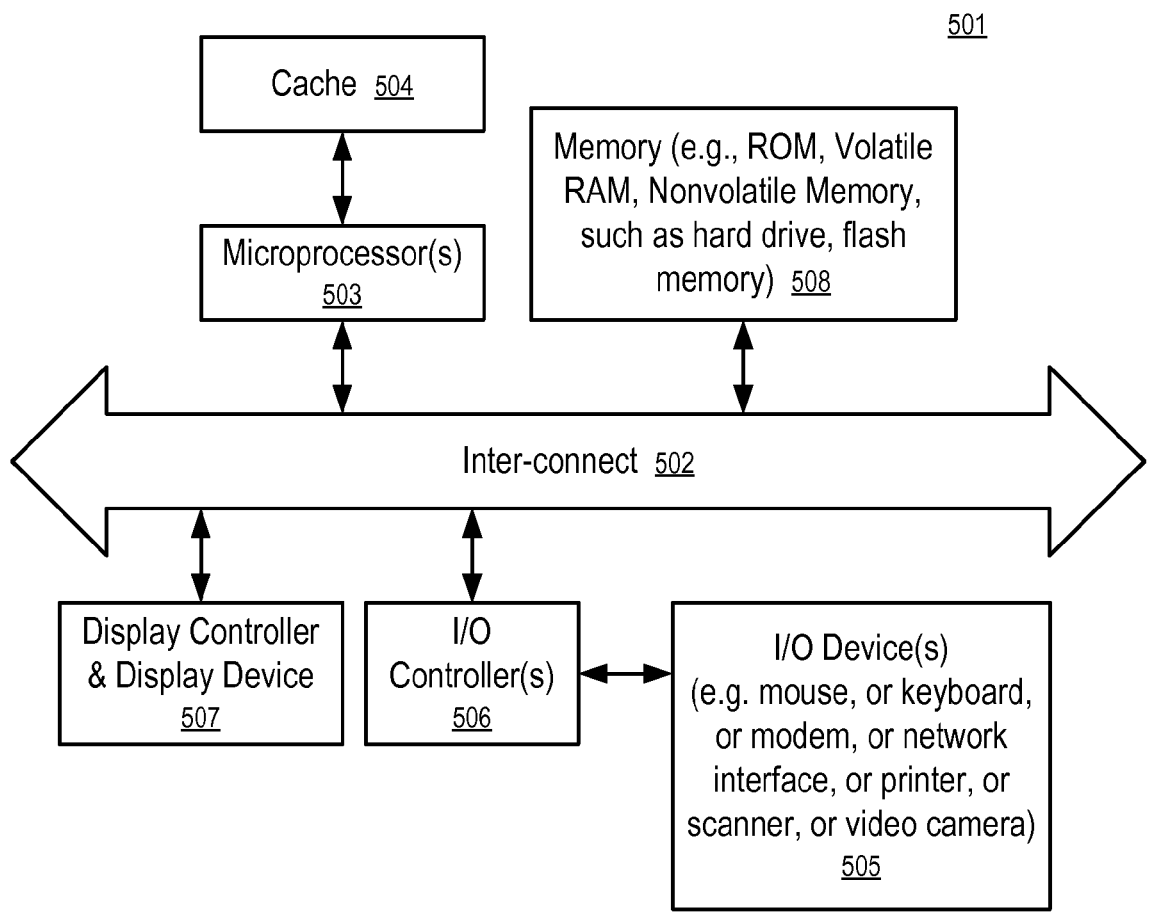
FIG. 23 shows a data processing system, which can be used in various embodiments.

FIG. 23 shows a data processing system, which can be used in various embodiments. While FIG. 23 illustrates various components of a computer system, it is not intended to represent any particular architecture or manner of interconnecting the components. Some embodiments may use other systems that have fewer or more components than those shown in FIG. 23.

In one embodiment, each of the interchange (101), the data storage facility (107), the controllers (115), the mobile phones (117), the user terminals (111), the account server (125), and the servers (113) can be implemented as a data processing system, with fewer or more components, as illustrated in FIG. 23.

In FIG. 23, the data processing system (501) includes an inter-connect (502) (e.g., bus and system core logic), which interconnects a microprocessor(s) (503) and memory (508). The microprocessor (503) is coupled to cache memory (504) in the example of FIG. 23.

The inter-connect (502) interconnects the microprocessor(s) (503) and the memory (508) together and also interconnects them to a display controller, display device (507), and to peripheral devices such as input/output (I/O) devices (505) through an input/output controller(s) (506).

Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect (502) may include one or more buses connected to one another through various bridges, controllers and/or adapters. In one embodiment, the I/O controller (506) includes a USB (Universal Serial Bus) adapter for controlling USB peripherals, and/or an IEEE-1394 bus adapter for controlling IEEE-1394 peripherals.

The memory (508) may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any apparatus that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer implemented method, comprising:
transmitting one or more first messages by a computer to collect payments on behalf of a merchant;
storing, by the computer in a data storage facility, records of funds collected based on the one or more of the first messages;
making, by the computer in the data storage facility, a risk estimation based at least in part on the records of funds collected based on the one or more of the first messages;
transmitting one or more second messages by the computer to collect payments on behalf of a merchant;
making a further risk estimation of a third message of the second messages not being paid for, based on statistical data and one or more characteristics of a transaction associated with the third message, wherein the one or more characteristics of the transaction includes at least one of: an Internet Protocol (IP) address used to initiate the transaction, a type of an item purchased in the transaction, a telecommunication carrier of a phone number to which the third message is transmitted, and an age of a user receiving the third message;
prior to receiving funds according to the one or more of the second messages, identifying by the computer a portion of a total amount of funds charged via the one or more of the second messages, the portion being based at least in part on the risk estimation of the records of funds collected based on the one or more the first messages and the further risk estimation of the third message;
prior to receiving funds according to the one or more of the second messages, paying, by the computer, the merchant the portion as an early partial settlement with the merchant;
after paying the merchant the portion as part of the early partial settlement, determining, by the computer, whether the funds have been received based on the transmission of the one or more second messages; and
paying, by the computer, the merchant a remainder of the total amount that excludes the portion of the early partial settlement if the funds have been received based on the transmission of the one or more second messages, wherein the one or more first and second messages are messages that are transmitted to one or more telecommunication carriers and the funds that are collected are collected from the one or more telecommunication carriers.

2. The method of claim 1, wherein the one or more first and second messages are multiple premium messages that are transmitted via one or more telecommunication carriers to the one or more phone numbers.

3. The method of claim 2, further comprising:
informing a lender about the portion to allow the merchant to borrow the portion from the lender before funds collected via the second premium messages become available.

4. The method of claim 3, wherein the identifying the portion comprises determining a ratio between an amount collected via the first premium messages and an amount charged via the first premium messages.

5. The method of claim 4, wherein the first premium messages are transmitted to collect payments on behalf of the merchant.

6. The method of claim 4, wherein the first premium messages are transmitted to collect payments on behalf of one or more merchants selling items in a same category as the merchant.

7. The method of claim 4, further comprising:
identifying third premium messages, the third premium messages being transmitted to different phone numbers based on purchase requests received from a single Internet Protocol (IP) address within a predetermined period of time, at least one of the third premium messages being transmitted on behalf of the merchant;
wherein funds charged via the at least one of the third premium messages are excluded from the portion.

8. The method of claim 1, further comprising:
identifying the portion to the merchant; and
responsive to a request from the merchant for the portion, providing by the computer the portion to the merchant, before funds collected based on the one or more of the second messages become available to the computer.

9. The method of claim 8, further comprising:
charging the merchant a fee based on a size of the portion.

10. The method of claim 9, wherein the fee is further based on a time period between the providing of the portion to the merchant and a date on which funds collected via the second messages are expected to be available.

11. The method of claim 2, wherein the portion is identified based on payment histories of users at the second phone numbers.

12. The method of claim 2, wherein the portion is identified based on a determination whether users at the second phone numbers are under a predetermined age limit.

13. The method of claim 2, further comprising:
identifying third premium messages from the second premium messages, the third premium messages having higher than a predetermined threshold a risk of not being paid for;
wherein the portion excludes an amount corresponding to funds charged via the third premium messages.

14. The method of claim 1, wherein the third message is a multiple premium message that is transmitted via one or more telecommunication carriers to or from the one or more phone numbers.

15. A non-transitory machine readable medium storing instructions, the instruction causing a computer to perform a method comprising:
transmitting one or more first messages by a computer to collect payments on behalf of a merchant;
storing, by the computer in a data storage facility, records of funds collected based on the one or more of the first messages;
making, by the computer in the data storage facility, a risk estimation based at least in part on the records of funds collected based on the one or more of the first messages;
transmitting one or more second messages by the computer to collect payments on behalf of a merchant;
making a further risk estimation of a third message of the second messages not being paid for, based on statistical data and one or more characteristics of a transaction associated with the third message, wherein the one or more characteristics of the transaction includes at least one of: an Internet Protocol (IP) address used to initiate the transaction, a type of an item purchased in the transaction, a telecommunication carrier of a phone number to which the third message is transmitted, and an age of a user receiving the third message;
prior to receiving funds according to the one or more of the second messages, identifying by the computer a portion of a total amount of funds charged via the one or more of the second messages, the portion being based at least in part on the risk estimation of the records of funds collected based on the one or more the first messages and the further risk estimation of the third message;
prior to receiving funds according to the one or more of the second messages, paying, by the computer, the merchant the portion as an early partial settlement with the merchant;
after paying the merchant the portion as part of the early partial settlement, determining, by the computer, whether the funds have been received based on the transmission of the one or more second messages; and
paying, by the computer, the merchant a remainder of the total amount that excludes the portion of the early partial settlement if the funds have been received based on the transmission of the one or more second messages, wherein the one or more first and second messages are messages that are transmitted to one or more telecommunication carriers and the funds that are collected are collected from the one or more telecommunication carriers.

16. A system, comprising:
a processor;
a computer-readable medium connected to the processor;
a network interface device connected to the processor; and a set of instructions stored on the computer-readable medium and executable by the processor to carry out a method comprising:

transmitting one or more first messages by a computer to collect payments on behalf of a merchant;

storing, by the computer in a data storage facility, records of funds collected based on the one or more of the first messages;

making, by the computer in the data storage facility, a risk estimation based at least in part on the records of funds collected based on the one or more of the first messages;

transmitting one or more second messages by the computer to collect payments on behalf of a merchant;

making a further risk estimation of a third message of the second messages not being paid for, based on statistical data and one or more characteristics of a transaction associated with the third message, wherein the one or more characteristics of the transaction includes at least one of: an Internet Protocol (IP) address used to initiate the transaction, a type of an item purchased in the transaction, a telecommunication carrier of a phone number to which the third message is transmitted, and an age of a user receiving the third message;

prior to receiving funds according to the one or more of the second messages, identifying by the computer a portion of a total amount of funds charged via the one or more of the second messages, the portion being based at least in part on the risk estimation of the records of funds collected based on the one or more the first messages and the further risk estimation of the third message;

prior to receiving funds according to the one or more of the second messages, paying, by the computer, the merchant the portion as an early partial settlement with the merchant;

after paying the merchant the portion as part of the early partial settlement, determining, by the computer, whether the funds have been received based on the transmission of the one or more second messages; and paying, by the computer, the merchant a remainder of the total amount that excludes the portion of the early partial settlement if the funds have been received based on the transmission of the one or more second messages, wherein the one or more first and second messages are messages that are transmitted to one or more telecommunication carriers and the funds that are collected are collected from the one or more telecommunication carriers.

* * * * *